(12) United States Patent
Gutman et al.

(10) Patent No.: US 12,199,749 B2
(45) Date of Patent: Jan. 14, 2025

(54) MEASURING SELF-INTERFERENCE FOR FULL-DUPLEX COMMUNICATIONS

(71) Applicant: QUALCOMM Incorporated, San Diego, CA (US)

(72) Inventors: Igor Gutman, Hod HaSharon (IL); Ori Shental, Marlboro, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 17/522,429

(22) Filed: Nov. 9, 2021

(65) Prior Publication Data

US 2023/0141998 A1    May 11, 2023

(51) Int. Cl.
*H04L 1/00*     (2006.01)
*H04L 5/00*     (2006.01)
*H04L 5/14*     (2006.01)

(52) U.S. Cl.
CPC .......... *H04L 1/0003* (2013.01); *H04L 5/0048* (2013.01); *H04L 5/14* (2013.01)

(58) Field of Classification Search
CPC ....... H04L 1/0003; H04L 5/0048; H04L 5/14; H04L 1/0015; H04L 5/0073; H04L 1/0071; H04L 5/0051; H04L 5/0053; H04L 5/0035; H04B 17/336; H04B 7/0626; H04B 7/0632; H04W 76/20
See application file for complete search history.

(56) References Cited

U.S. PATENT DOCUMENTS

| | | | | |
|---|---|---|---|---|
| 11,316,575 | B2* | 4/2022 | Levy | H04L 5/0051 |
| 2016/0323830 | A1* | 11/2016 | Kim | H04L 5/0048 |
| 2018/0123710 | A1* | 5/2018 | Kim | H04B 1/12 |
| 2020/0083980 | A1* | 3/2020 | Papasakellariou | H04W 52/34 |
| 2020/0252950 | A1* | 8/2020 | Yang | H04L 5/0053 |
| 2021/0297959 | A1* | 9/2021 | Zhou | H04W 52/34 |

(Continued)

FOREIGN PATENT DOCUMENTS

| | | | | |
|---|---|---|---|---|
| WO | WO-2015096027 A1 * | 7/2015 | | H04B 7/0417 |
| WO | WO-2017020710 A1 | 2/2017 | | |
| WO | WO-2021003660 A1 * | 1/2021 | | H04B 7/15542 |

OTHER PUBLICATIONS

International Search Report and Written Opinion—PCT/US2022/079391—ISA/EPO—Feb. 10, 2023.

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. For instance, a first device may transmit a reference signal to a second device and the second device may measure self-interference at the second device. In a first example, the second device may transmit an indication of channel state information to the first device along with an interference report including a measure of the self-interference, which the first device may use to determine an MCS and/or a rank. In a second example, the second device may determine an MCS and/or rank based on measuring the self-interference. In some examples, the second device may transmit a first indication of the MCS and/or rank determined based on measuring the self-interference to the first device along with a second indication that the MCS and/or rank is associated with full-duplex communications at the second device.

22 Claims, 14 Drawing Sheets

(56) References Cited

U.S. PATENT DOCUMENTS

| | | | |
|---|---|---|---|
| 2021/0345145 A1* | 11/2021 | Sarkis | H04W 72/02 |
| 2021/0345374 A1* | 11/2021 | Abotabl | H04L 5/14 |
| 2021/0345399 A1* | 11/2021 | Levy | H04L 5/0073 |
| 2022/0095142 A1* | 3/2022 | Landis | H04B 17/336 |
| 2022/0131588 A1* | 4/2022 | Elshafie | H04B 7/0626 |
| 2022/0141852 A1* | 5/2022 | Zhang | H04B 7/0632 |
| | | | 370/329 |
| 2022/0256387 A1* | 8/2022 | Xiao | H04L 5/0035 |
| 2023/0047695 A1* | 2/2023 | Sarkis | H04B 17/336 |
| 2023/0141998 A1* | 5/2023 | Gutman | H04L 1/0009 |
| | | | 370/329 |
| 2023/0189382 A1* | 6/2023 | Haustein | H04W 76/20 |
| | | | 370/329 |

* cited by examiner

MEASURING SELF-INTERFERENCE FOR FULL-DUPLEX COMMUNICATIONS

FIELD OF TECHNOLOGY

The following relates to wireless communications, including measuring self-interference for full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE or a base station may transmit a signal. If the UE or the base station is configured to transmit and receive simultaneously, the UE or the base station may experience self-interference as a result of transmitting the signal. Failing to compensate for self-interference may decrease a likelihood that the UE or the base station may successfully decode transmissions communicated to the UE or the base station via another UE or base station.

SUMMARY

The described techniques relate to improved methods, systems, devices, and apparatuses that support measuring self-interference for full-duplex communications. Generally, the described techniques provide for a wireless device to adjust one or more communications parameters (e.g., a modulation and coding scheme (MCS), a rank) based on a measure of self-interference. For instance, a first device may transmit a reference signal to a second device and the second device may measure self-interference at the second device. In a first example, the second device may transmit an indication of channel state information to the first device along with an interference report including a measure of the self-interference, which the first device may use to determine an MCS and/or a rank. In a second example, the second device may determine an MCS and/or rank based on measuring the self-interference. In some examples, the second device may transmit a first indication of the MCS and/or rank determined based on measuring the self-interference to the first device along with a second indication that the MCS and/or rank is associated with full-duplex communications at the second device.

A method for wireless communication at a first device is described. The method may include transmitting a reference signal to a second device over a first carrier, where the first carrier is configured for full-duplex operations for the first device, receiving, from the second device, an indication of channel state information for the first carrier based on transmitting the reference signal, receiving, from the second device, an interference report for the first carrier, where the interference report is associated with a measurement resource of the first carrier coinciding with a transmission resource for the second device over the first carrier or a second carrier, and communicating with the second device based on a modulation and coding scheme (MCS), the MCS determined based on the channel state information and the interference report.

An apparatus for wireless communication at a first device is described. The apparatus may include a processor, memory coupled with the processor, and instructions stored in the memory. The instructions may be executable by the processor to cause the apparatus to transmit a reference signal to a second device over a first carrier, where the first carrier is configured for full-duplex operations for the first device, receive, from the second device, an indication of channel state information for the first carrier based on transmitting the reference signal, receive, from the second device, an interference report for the first carrier, where the interference report is associated with a measurement resource of the first carrier coinciding with a transmission resource for the second device over the first carrier or a second carrier, and communicate with the second device based on a modulation and coding scheme (MCS), the MCS determined based on the channel state information and the interference report.

Another apparatus for wireless communication at a first device is described. The apparatus may include means for transmitting a reference signal to a second device over a first carrier, where the first carrier is configured for full-duplex operations for the first device, means for receiving, from the second device, an indication of channel state information for the first carrier based on transmitting the reference signal, means for receiving, from the second device, an interference report for the first carrier, where the interference report is associated with a measurement resource of the first carrier coinciding with a transmission resource for the second device over the first carrier or a second carrier, and means for communicating with the second device based on a modulation and coding scheme (MCS), the MCS determined based on the channel state information and the interference report.

A non-transitory computer-readable medium storing code for wireless communication at a first device is described. The code may include instructions executable by a processor to transmit a reference signal to a second device over a first carrier, where the first carrier is configured for full-duplex operations for the first device, receive, from the second device, an indication of channel state information for the first carrier based on transmitting the reference signal, receive, from the second device, an interference report for the first carrier, where the interference report is associated with a measurement resource of the first carrier coinciding with a transmission resource for the second device over the first carrier or a second carrier, and communicate with the second device based on a modulation and coding scheme (MCS), the MCS determined based on the channel state information and the interference report.

Some examples of the method, apparatuses, and non-transitory computer-readable medium described herein may further include operations, features, means, or instructions for communicating with the second device based on a rank, the rank determined based on the channel state information and the interference report.

In some examples of the method, apparatuses, and non-transitory computer-readable medium described herein, the channel state information includes an indication of a second rank and the rank may be determined based on the second rank.

Some examples of the method, apparatuses, and non-transitory computer-readable medium described herein may further include operations, features, means, or instructions for communicating with the second device over second resources based on the second rank, where communicating based on the second rank may be based on the second device being configured to perform half-duplex communications for the second resources.

Some examples of the method, apparatuses, and non-transitory computer-readable medium described herein may further include operations, features, means, or instructions for communicating based on the MCS may be based on the second device being configured to perform full-duplex communications for a resource associated with the communicating.

In some examples of the method, apparatuses, and non-transitory computer-readable medium described herein, the channel state information includes a second MCS, the MCS determined based on the second MCS.

Some examples of the method, apparatuses, and non-transitory computer-readable medium described herein may further include operations, features, means, or instructions for communicating with the second device over second resources based on the second MCS, where communicating based on the second MCS may be based on the second device being configured to perform half-duplex communications for the second resources.

In some examples of the method, apparatuses, and non-transitory computer-readable medium described herein, receiving the interference report may include operations, features, means, or instructions for receiving a cross-link interference report associated with the measurement resource of the first carrier coinciding with the transmission resource for the second device.

In some examples of the method, apparatuses, and non-transitory computer-readable medium described herein, the reference signal may be scheduled to be transmitted over a resource that overlaps with the transmission resource in time and frequency, and the measurement resource coincides with the transmission resource over the first carrier.

In some examples of the method, apparatuses, and non-transitory computer-readable medium described herein, the reference signal may be scheduled to be transmitted over a resource of the first carrier that overlaps with the transmission resource in time, and the transmission resource may be over the second carrier.

In some examples of the method, apparatuses, and non-transitory computer-readable medium described herein, the first device includes a base station and the second device includes a user equipment (UE).

In some examples of the method, apparatuses, and non-transitory computer-readable medium described herein, the indication of the channel state information and the interference report may be multiplexed in a same message.

A method for wireless communication at a first device is described. The method may include receiving, from a second device, a reference signal over first resources of a first carrier, where the first carrier is configured for full-duplex operations for the first device, transmitting a first signal over second resources that overlap in time with the first resources for receiving the reference signal, receiving at least a portion of the first signal, determining a modulation and coding scheme (MCS) based on receiving the reference signal and the at least the portion of the first signal, and communicating with the second device based on the determined MCS.

An apparatus for wireless communication at a first device is described. The apparatus may include a processor, memory coupled with the processor, and instructions stored in the memory. The instructions may be executable by the processor to cause the apparatus to receive, from a second device, a reference signal over first resources of a first carrier, where the first carrier is configured for full-duplex operations for the first device, transmit a first signal over second resources that overlap in time with the first resources for receiving the reference signal, receive at least a portion of the first signal, determine a modulation and coding scheme (MCS) based on receiving the reference signal and the at least the portion of the first signal, and communicate with the second device based on the determined MCS.

Another apparatus for wireless communication at a first device is described. The apparatus may include means for receiving, from a second device, a reference signal over first resources of a first carrier, where the first carrier is configured for full-duplex operations for the first device, means for transmitting a first signal over second resources that overlap in time with the first resources for receiving the reference signal, means for receiving at least a portion of the first signal, means for determining a modulation and coding scheme (MCS) based on receiving the reference signal and the at least the portion of the first signal, and means for communicating with the second device based on the determined MCS.

A non-transitory computer-readable medium storing code for wireless communication at a first device is described. The code may include instructions executable by a processor to receive, from a second device, a reference signal over first resources of a first carrier, where the first carrier is configured for full-duplex operations for the first device, transmit a first signal over second resources that overlap in time with the first resources for receiving the reference signal, receive at least a portion of the first signal, determine a modulation and coding scheme (MCS) based on receiving the reference signal and the at least the portion of the first signal, and communicate with the second device based on the determined MCS.

Some examples of the method, apparatuses, and non-transitory computer-readable medium described herein may further include operations, features, means, or instructions for determining a rank based on receiving the reference signal and the at least the portion of the first signal, where communicating with the second device may be based on the determined rank.

Some examples of the method, apparatuses, and non-transitory computer-readable medium described herein may further include operations, features, means, or instructions for measuring self-interference at the first device based on receiving the at least the portion of the first signal, where determining the MCS may be based on measuring the self-interference.

In some examples of the method, apparatuses, and non-transitory computer-readable medium described herein, the second resources may be of the first carrier.

In some examples of the method, apparatuses, and non-transitory computer-readable medium described herein, the second resources may be of a second carrier different than the first carrier.

In some examples of the method, apparatuses, and non-transitory computer-readable medium described herein, the first device includes a base station and the second device includes a UE.

A method for wireless communication at a first device is described. The method may include receiving, from a second device, a reference signal, transmitting, to the second device, a first indication of a modulation and coding scheme (MCS) for a carrier and a second indication that the MCS is associated with full-duplex communications at the first device, and communicating with the second device based on transmitting the first indication of the MCS and the second indication that the MCS is associated with the full-duplex communications at the first device.

An apparatus for wireless communication at a first device is described. The apparatus may include a processor, memory coupled with the processor, and instructions stored in the memory. The instructions may be executable by the processor to cause the apparatus to receive, from a second device, a reference signal, transmit, to the second device, a first indication of a modulation and coding scheme (MCS) for a carrier and a second indication that the MCS is associated with full-duplex communications at the first device, and communicate with the second device based on transmitting the first indication of the MCS and the second indication that the MCS is associated with the full-duplex communications at the first device.

Another apparatus for wireless communication at a first device is described. The apparatus may include means for receiving, from a second device, a reference signal, means for transmitting, to the second device, a first indication of a modulation and coding scheme (MCS) for a carrier and a second indication that the MCS is associated with full-duplex communications at the first device, and means for communicating with the second device based on transmitting the first indication of the MCS and the second indication that the MCS is associated with the full-duplex communications at the first device.

A non-transitory computer-readable medium storing code for wireless communication at a first device is described. The code may include instructions executable by a processor to receive, from a second device, a reference signal, transmit, to the second device, a first indication of a modulation and coding scheme (MCS) for a carrier and a second indication that the MCS is associated with full-duplex communications at the first device, and communicate with the second device based on transmitting the first indication of the MCS and the second indication that the MCS is associated with the full-duplex communications at the first device.

Some examples of the method, apparatuses, and non-transitory computer-readable medium described herein may further include operations, features, means, or instructions for transmitting, to the second device, a third indication of a rank and a fourth indication that the rank may be associated with full-duplex communications on the carrier at the first device, where communicating with the second device may be based on transmitting the third indication of the rank and the fourth indication that the rank may be associated with full-duplex communications at the first device.

In some examples of the method, apparatuses, and non-transitory computer-readable medium described herein, the second indication and the fourth indication correspond to a same bit.

Some examples of the method, apparatuses, and non-transitory computer-readable medium described herein may further include operations, features, means, or instructions for performing full-duplex communications at the first device, where performing the full-duplex communications includes transmitting a signal on the carrier and receiving at least a portion of the signal at the first device, and where transmitting the first indication and the second indication may be based on receiving the at least the portion of the signal.

In some examples of the method, apparatuses, and non-transitory computer-readable medium described herein, the at least the portion of the signal may be received on the carrier.

In some examples of the method, apparatuses, and non-transitory computer-readable medium described herein, the at least the portion of the signal may be received on a second carrier different than the carrier.

In some examples of the method, apparatuses, and non-transitory computer-readable medium described herein, transmitting the first indication and the second indication may include operations, features, means, or instructions for transmitting, to the second device, channel state feedback that includes the first indication and the second indication.

In some examples of the method, apparatuses, and non-transitory computer-readable medium described herein, receiving the reference signal may include operations, features, means, or instructions for receiving, from the second device, a channel state information reference signal.

In some examples of the method, apparatuses, and non-transitory computer-readable medium described herein, the first device includes a UE and the second device includes a base station.

A method for wireless communication at a first device is described. The method may include transmitting, to a second device, a reference signal, receiving, from the second device, a first indication of a modulation and coding scheme (MCS) for a carrier and a second indication that the MCS is associated with full-duplex communications at the second device, and communicating with the second device based on receiving the first indication of the MCS and the second indication that the MCS is associated with the full-duplex communications at the second device.

An apparatus for wireless communication at a first device is described. The apparatus may include a processor, memory coupled with the processor, and instructions stored in the memory. The instructions may be executable by the processor to cause the apparatus to transmit, to a second device, a reference signal, receive, from the second device, a first indication of a modulation and coding scheme (MCS) for a carrier and a second indication that the MCS is associated with full-duplex communications at the second device, and communicate with the second device based on receiving the first indication of the MCS and the second indication that the MCS is associated with the full-duplex communications at the second device.

Another apparatus for wireless communication at a first device is described. The apparatus may include means for transmitting, to a second device, a reference signal, means for receiving, from the second device, a first indication of a modulation and coding scheme (MCS) for a carrier and a second indication that the MCS is associated with full-duplex communications at the second device, and means for communicating with the second device based on receiving the first indication of the MCS and the second indication that the MCS is associated with the full-duplex communications at the second device.

A non-transitory computer-readable medium storing code for wireless communication at a first device is described. The code may include instructions executable by a processor to transmit, to a second device, a reference signal, receive, from the second device, a first indication of a modulation and coding scheme (MCS) for a carrier and a second indication that the MCS is associated with full-duplex communications at the second device, and communicate with the second device based on receiving the first indication of the MCS and the second indication that the MCS is associated with the full-duplex communications at the second device.

Some examples of the method, apparatuses, and non-transitory computer-readable medium described herein may further include operations, features, means, or instructions for receiving, from the second device, a third indication of a rank and a fourth indication that the rank may be associated with full-duplex communications on the carrier at the first device, where communicating with the second device may be based on receiving the third indication of the rank and the fourth indication that the rank may be associated with full-duplex communications at the second device.

In some examples of the method, apparatuses, and non-transitory computer-readable medium described herein, the second indication and the fourth indication correspond to a same bit.

In some examples of the method, apparatuses, and non-transitory computer-readable medium described herein, receiving the first indication and the second indication may include operations, features, means, or instructions for receiving, from the second device, channel state feedback that includes the first indication and the second indication.

In some examples of the method, apparatuses, and non-transitory computer-readable medium described herein, the first device includes a base station and the second device includes a UE.

DETAILED DESCRIPTION

In some examples, a first wireless device (e.g., a base station, a UE) may communicate with a second wireless device (e.g., a base station. a UE) using a modulation and coding scheme (MC S) and/or a rank. However, the MCS and/or rank may fail to account for the self-interference that occurs during full-duplex communications at the first wireless device and/or the second wireless device. In some such examples, the first wireless device or the second wireless device may be less likely to successfully decode a transmission from the second wireless device or the first wireless device, respectively. Accordingly, the efficiency of communications between the first wireless device and the second wireless device may decrease.

The methods of the present disclosure may enable the first wireless device and/or the second wireless device to account for self-interference when determining MCS and/or rank. For instance, the first wireless device may transmit a reference signal to the second wireless device, and the second wireless device may transmit, to the first wireless device, channel state information (e.g., an MCS and/or rank) generated based on measuring the reference signal. Additionally, the second wireless device may transmit an interference report indicating a measure of self-interference at the second wireless device. In some such examples, the first wireless device may determine an MCS and/or rank (e.g., an updated MCS and/or rank) based on the indicated channel state information and the measure of self-interference.

Additionally, or alternatively, the first wireless device may transmit a reference signal to the second wireless device and the second wireless device may measure self-interference. The second wireless device may determine an MCS and/or rank based on receiving the reference signal and measuring self-interference. In some examples, the second wireless device may transmit the MCS and/or rank to the first wireless device. Additionally, the second wireless device may transmit an indication that the MCS and/or rank is associated with full-duplex communications at the second wireless device (e.g., an indication that the second wireless device has measured self-interference).

Aspects of the disclosure are initially described in the context of wireless communications systems. Additional aspects of the disclosure are described in the context of process flows. Aspects of the disclosure are further illustrated by and described with reference to apparatus diagrams, system diagrams, and flowcharts that relate to measuring self-interference for full-duplex communications.

Figure 1:
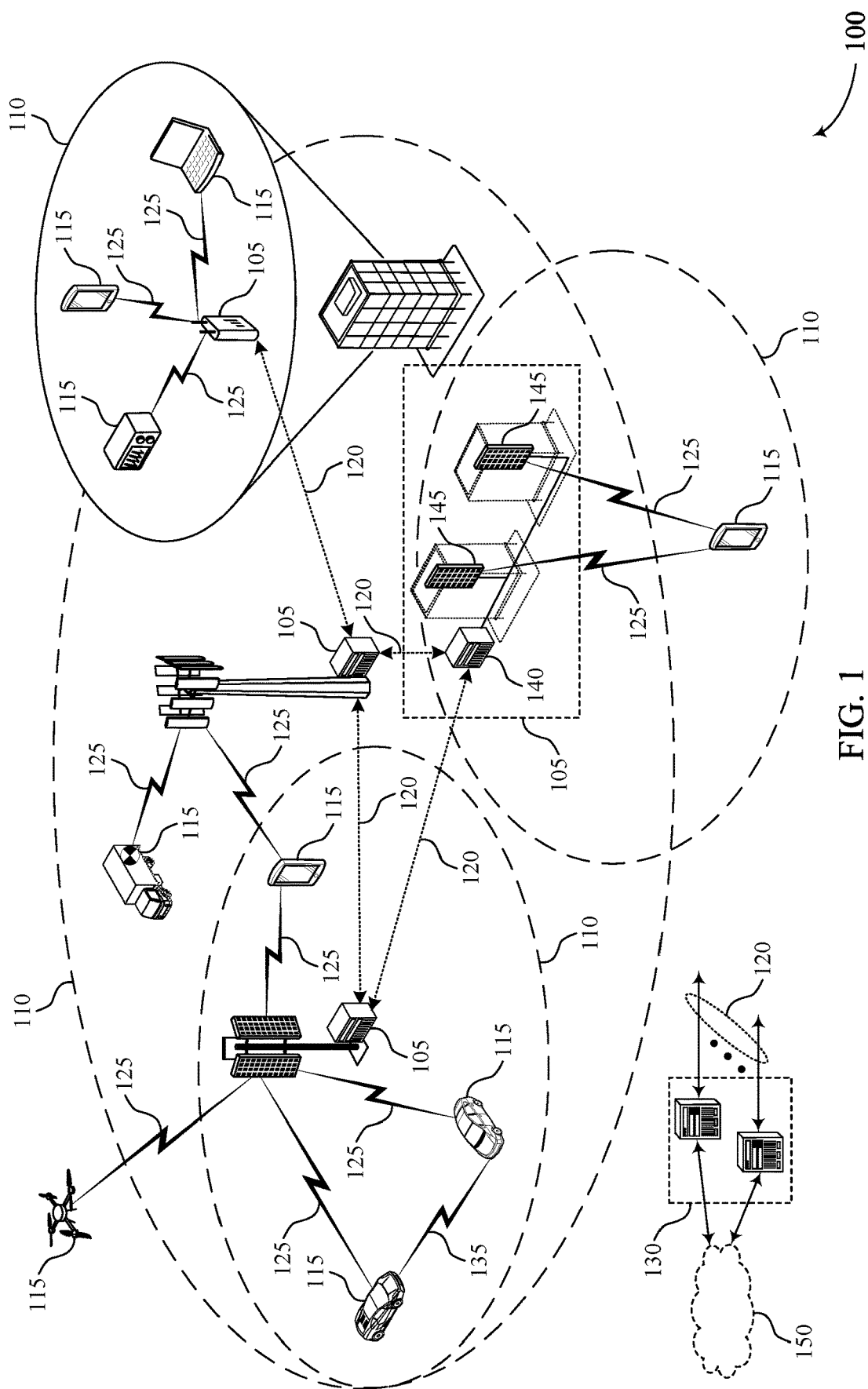
FIG. 1 illustrates an example of a wireless communications system that supports measuring self-interference for full-duplex communications in accordance with aspects of the present disclosure.

FIG. 1 illustrates an example of a wireless communications system 100 that supports measuring self-interference for full-duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless device may be configured to transmit and receive using different time resources, which may be called half-duplex communications. In other examples, a wireless device may be configured to transmit and receive using overlapping time resources, which may be called full-duplex communications.

In some examples, a first wireless device (e.g., a base station, a UE) may communicate with a second wireless device (e.g., a base station. a UE) using a modulation and coding scheme (MCS) and/or a rank. However, the MCS and/or rank may fail to account for the self-interference that occurs during full-duplex communications at the first wireless device and/or the second wireless device. In some such examples, the first wireless device or the second wireless device may be less likely to successfully decode a transmission from the second wireless device or the first wireless device, respectively. Accordingly, the efficiency of communications between the first wireless device and the second wireless device may decrease.

The methods of the present disclosure may enable the first wireless device and/or the second wireless device to account for self-interference when determining MCS and/or rank. For instance, the first wireless device may transmit a reference signal to the second wireless device, and the second wireless device may transmit, to the first wireless device, an MCS and/or rank generated based on measuring the reference signal. Additionally, the second wireless device may transmit an interference report indicating a measurement of self-interference at the second wireless device. In some such examples, the first wireless device may determine an updated MCS and/or rank based on the indicated MCS and/or rank and the measurement of self-interference.

Additionally, or alternatively, the first wireless device may transmit a reference signal to the second wireless device and the second wireless device may measure self-interference. The second wireless device may determine an MCS and/or rank based on receiving the reference signal and measuring self-interference. In some examples, the second wireless device may transmit the MCS and/or rank to the first wireless device. Additionally, the second wireless device may transmit an indication that the MCS and/or rank is associated with full-duplex communications at the second wireless device (e.g., an indication that the MCS and/or rank reported by the second wireless device accounts for self-interference).

Figure 2:
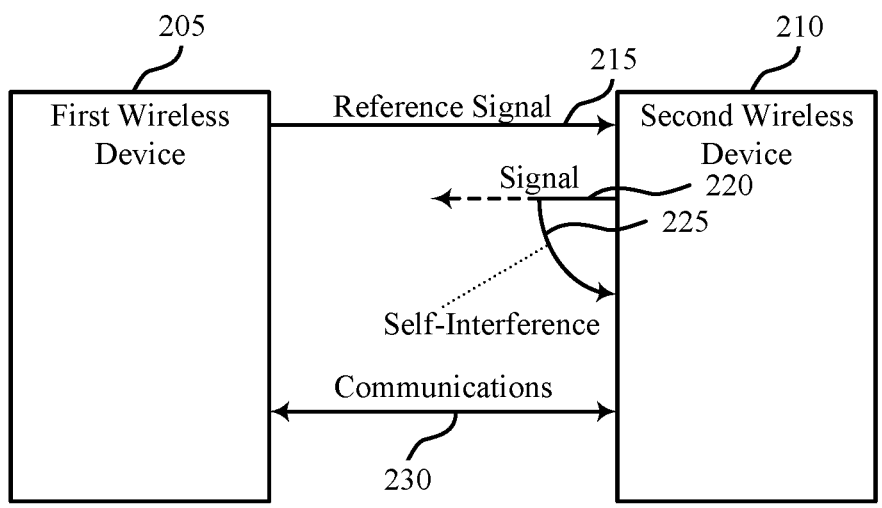
FIG. 2 illustrates an example of a wireless communications system that supports measuring self-interference for full-duplex communications in accordance with aspects of the present disclosure.

FIG. 2 illustrates an example of a wireless communications system 200 that supports measuring self-interference for full-duplex communications in accordance with aspects of the present disclosure. In some examples, wireless communications system 200 may implement one or more aspects of wireless communications system 100. For instance, first wireless device 205 and second wireless device 210 may each be an example of a UE 115 or a base station 105 as described with reference to FIG. 1.

In some examples, self-interference at first wireless device 205 and/or second wireless device 210 may be present. For instance, when first wireless device 205 or second wireless device 210 transmits signaling in a full-duplex mode over a transmission resource, first wireless device 205 or second wireless device 210 may receive at least a portion of the signaling as self-interference over a measurement resource (e.g., on a same carrier or a different carrier). In some examples, self-interference may be leakage from a transmitter to a receiver at a same node. In some examples, self-interference may be present due to the presence of multipath arriving from one or more reflectors of signaling from first wireless device 205 or second wireless device 210. In some examples, an amount of self-interference present at the first wireless device 205 or second wireless device 210 may vary over time. Accordingly, devices that compensate for self-interference using a static value or constant may fail to account for changes in the self-interference.

The present disclosure may describe methods that enable a wireless device (first wireless device 205 and/or second wireless device 210) to account for self-interference. For instance, to enable full-duplex operation, first wireless device 205 and/or second wireless device 210 may employ digital cancellation, spatial nulling, spatial tapering, beam management, or any combination thereof. However, some or each of these techniques may include the first wireless device 205 and/or second wireless device 210 frequently measuring a spatial channel between first wireless device 205 and/or second wireless device 210 and a reflector (e.g., measuring over a threshold number of times in a duration). Accordingly, the efficiency of self-interference cancellation may be limited.

One method to increase self-interference cancellation efficiency may include using frequency division multiplexed (FDM) full-duplex, in which carriers (e.g., component carriers (CCs)), sub-bands, resource blocks, resource block groups, or bandwidth parts (BWPs) allocated for transmitting are not allocated for receiving. FDM full-duplex may also be called sub-band full-duplex (SBFD). Using SBFD may assist with decreasing self-interference. However, using SBFD (e.g., null allocation on receiver CCs) may reduce a number of frequency resources available to be used for receiving and/or transmitting.

Another method may include using an adjusted rank and/or MCS on carriers for receiving transmissions (e.g., on slots in which full-duplex communications is configured). For instance, when full-duplexing is applied and a self-interference cancellation mechanism indicates that a post-self-interference cancelation signal to noise ratio (SNR) is below a threshold for maintaining full-duplexing with a configured MCS and/or rank, the MCS and/or rank may be reduced (e.g., per receiving and/or transmitting beam pair). The reduced MCS and/or rank may be determined as part of self-interference sensing and/or measuring previous transmission allocations. By using the adjusted rank and/or MCS, the first wireless device 205 and/or the second wireless device 210 may increase a throughput when receiving transmissions. In some examples, the reduced MCS and/or rank may be applied depending on a corresponding beam pair (e.g., receiving beam and transmission configuration indicator (TCI) state), as the beam pair may be associated with a post-cancelation self-interference power and may be calculated periodically.

In some examples, to determine the adjusted rank and/or MCS, first wireless device 205 may transmit, to second wireless device 210, a reference signal 215. The reference signal 215 may be transmitted over a first carrier, which may be configured for full-duplex operations for the first wireless device 205. For example, the first wireless device 205 may communicate with the second wireless device 205 in a full-duplex mode over the first carrier, or the first wireless device 205 may communicate with the second wireless device 210 in a half-duplex mode over the carrier in a first link direction (e.g., one of downlink or uplink), and may communicate with a third wireless device in a half-duplex mode over the carrier concurrently in a second link direction (e.g., the other of downlink or uplink). In some cases, the first wireless device 205 and the second wireless device 210 may be configured to communicate in a full-duplex mode over a set of carriers including the first carrier, where the second wireless device is configured to communication in a half-duplex mode for each of the carriers of the set of carriers. For example, the set of carriers may be adjacent carriers in a spectrum band, and may thus occupy adjacent frequency resources (e.g., with a guardband). Self-interference may be caused by out-of-band emissions by the second wireless device from transmissions over a second carrier of the set of carriers that occur concurrently to receiving signals over the first carrier. Alternatively, the second wireless device 210 may be configured to communicate in the full-duplex mode over one or more carriers of the set of carriers.

The second wireless device 210 may measure self-interference. For instance, the second wireless device 210 may transmit a signal 220 over a transmission resource on first frequency resources and may receive at least a portion 225 of the energy of the signal over a measurement resource on the first frequency resources or second frequency resources. In a first example, the second wireless device 210 may transmit an indication of a first MCS and/or a first rank and may also transmit an interference report (e.g., a cross-link interference (CLI) report) indicating the measured value of the self-interference. In some cases, the first wireless device 205 may configure the second wireless device 210 for measuring CLI during resources of a transmission by the second wireless device 210. The first wireless device 205 may determine an updated MCS and/or rank based on the measured value of the self-interference and the first MCS and/or the first rank, respectively. In some examples, the second wireless device 210 may determine the MCS and/or the rank based on the reference signal and the received portion of the signal and may communicate according to the determined MCS and/or the rank via communications 230. In some examples, the second wireless device 210, after determining the MCS and/or the rank, may transmit the MCS and/or the rank to the first wireless device 205 as well as an indication that the MCS and/or the rank were determined for resources for which the second wireless device 210 operated in a full-duplex mode. Based on the MCS and/or the rank and the indication that the second wireless device 210 operated in the full-duplex mode for determining the MCS and/or rank, the first wireless device 205 may communicate according to the indicated MCS and/or the indicated rank via communications 230. Additional details about these examples may be described herein, for instance, with reference to FIGS. 3, 4, and 5, respectively.

In some examples, the methods described herein may be associated with one or more advantages. For instance, adjusting MCS and/or rank according to whether a receiving device is operating in a full-duplex mode may enable increased throughput on average (e.g., as compared to using SBFD).

Figure 3:
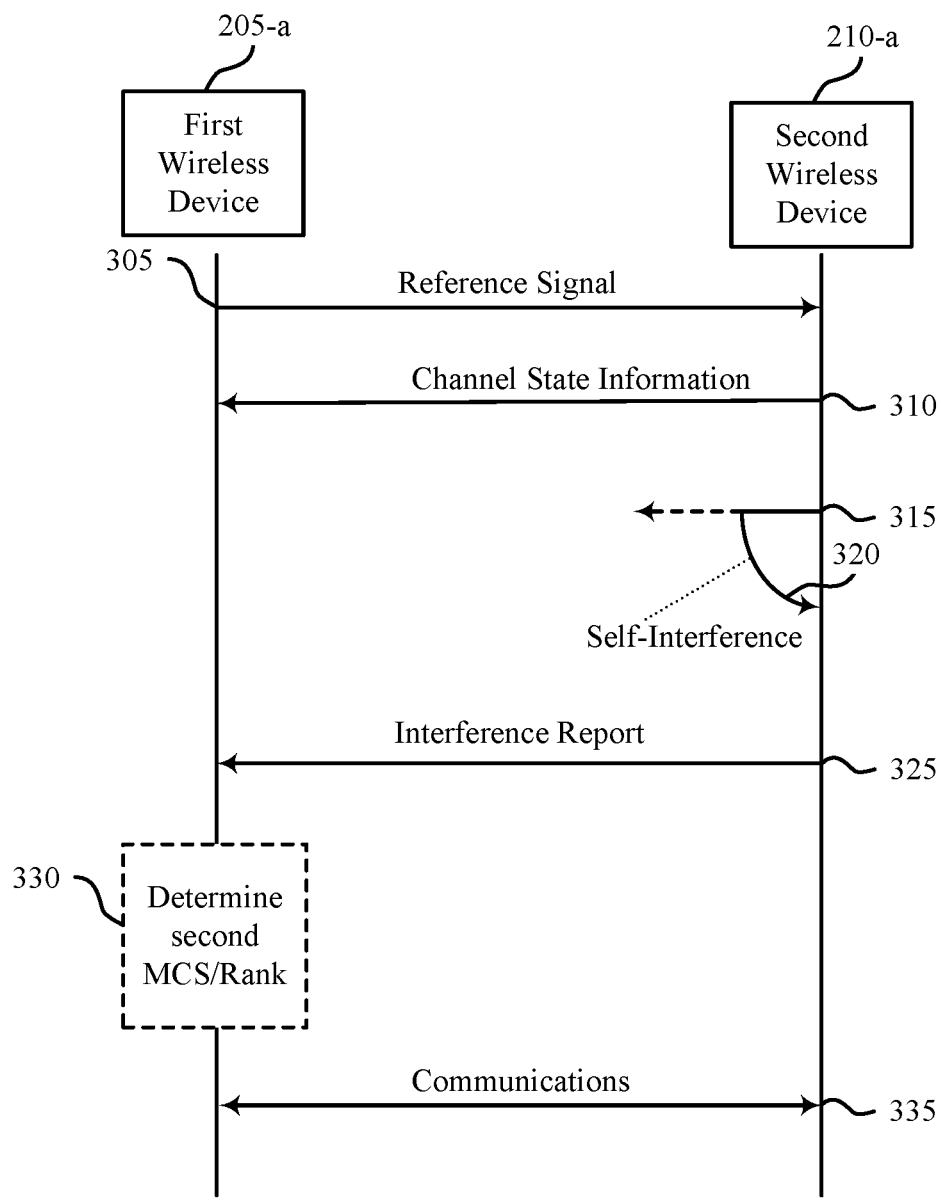
FIG. 3 illustrates an example of a process flow that supports measuring self-interference for full-duplex communications in accordance with aspects of the present disclosure.

FIG. 3 illustrates an example of a process flow 300 that supports measuring self-interference for full-duplex communications in accordance with aspects of the present disclosure. In some examples, process flow 300 may be implemented by one or more aspects of wireless communications systems 100 and/or 200. For instance, first wireless device 205-*a* may be an example of a first wireless device 205 as described with reference to FIG. 2 and/or a UE 115 or base station 105 as described with reference to FIG. 1. Additionally, second wireless device 210-*a* may be an example of a second wireless device 210 as described with reference to FIG. 2 and/or a UE 115 or base station 105 as described with reference to FIG. 1.

At 305, first wireless device 205-*a* may transmit, to second wireless device 210-*a*, a reference signal (e.g., a channel state information (CSI) reference signal (CSI-RS), a sounding reference signal (SRS)). In some examples, first wireless device 205-*a* may transmit the reference signal over a first carrier, where the first carrier is configured for full-duplex operations for the first wireless device 205-*a*.

At 310, second wireless device 210-*a* may transmit, to first wireless device 205-*a*, channel state information (e.g., an indication of a first MCS and/or a first rank) for a first carrier (e.g., a first CC). In some examples, second wireless device 210-*a* may transmit the indication of the channel state information based on receiving the reference signal from first wireless device 205-*a*. In some examples, the second wireless device 210-*a* transmitting the indication of the channel state information may include the second wireless device 210-*a* transmitting channel state feedback (CSF) including the indication of the channel state information.

At 315 and 320, second wireless device 210-*a* may measure self-interference at the second wireless device 210-*a*. For instance, at 315, the second wireless device 210-*a* may transmit a signal over a transmission resource on first frequency resources (e.g., a first carrier, a first bandwidth part, a first set of resource blocks) and may measure the self-interference over a measurement resource (e.g., at 320) on the first frequency resources or second frequency resources (e.g., a second carrier, a second bandwidth part, a second set of resource blocks). In some such examples, the measurement resource may coincide with the transmission resource. For example, the first wireless device 205-*a* may configure the second wireless device 210-*a* to transmit an SRS over a set of time-frequency resources, and may configure the second wireless device 210-*a* to measure CLI (e.g., received signal strength indicator (RSSI) CLI) over time-frequency resources at least partially overlapping with the set of time-frequency resources. In some examples, the indication of the channel state information and the interference report may be multiplexed in a same message (e.g., they may be jointly encoded).

At 325, second wireless device 210-*a* may transmit, to first wireless device 205-*a*, an interference report for the first carrier. In some such examples, the interference report may be associated with a measurement resource of the first carrier coinciding with a transmission resource for second wireless device 210-*a* over the first carrier or a second carrier. In some examples, the interference report may be a CLI report associated with the measurement resource of the first frequency resources that coincides with the transmission resource for the second wireless device 210-*a*. In some examples, the reference signal may be scheduled to be transmitted over a resource that overlaps with the transmission resource in time and frequency. In some such examples, the measurement resource may coincide with the transmission resource over the first frequency resources. Additionally, or alternatively, the reference signal may be scheduled to be transmitted over a set of resources that overlaps with the transmission resource in time, where the transmission resource is over different frequency resources.

At 330, second wireless device 210-*a* may determine an MCS (e.g., a second MCS) and/or a rank (e.g., a second rank) based on the channel state information and the interference report. For instance, second wireless device 210-*a* may determine a second MCS based on the first MCS and the interference report and/or may determine a second rank based on the first rank and the interference report.

At 335, first wireless device 205-*a* may perform communications with second wireless device 210-*a*. For instance, first wireless device 205-*a* may communicate with second wireless device 210-*a* based on the MCS and/or the rank determined at 330. In some examples, the first wireless device 205-*a* may communicate with the second wireless device 210-*a* over second resources based on the first rank, where communicating based on the first rank is based on the second wireless device 210-*a* being configured to perform half-duplex communications for the second resources. In some examples, the first wireless device 205-*a* communicating based on the second MCS may be based on the second wireless device 210-*a* being configured to perform full-duplex communications for a resource associated with the communicating. Additionally, or alternatively, the first wireless device 205-*a* may communicate with the second wireless device 210-*a* over second resources based on the first MCS, where communicating based on the first MCS is based on the second wireless device 210-*a* being configured to perform half-duplex communications for the second resources.

Figure 4:
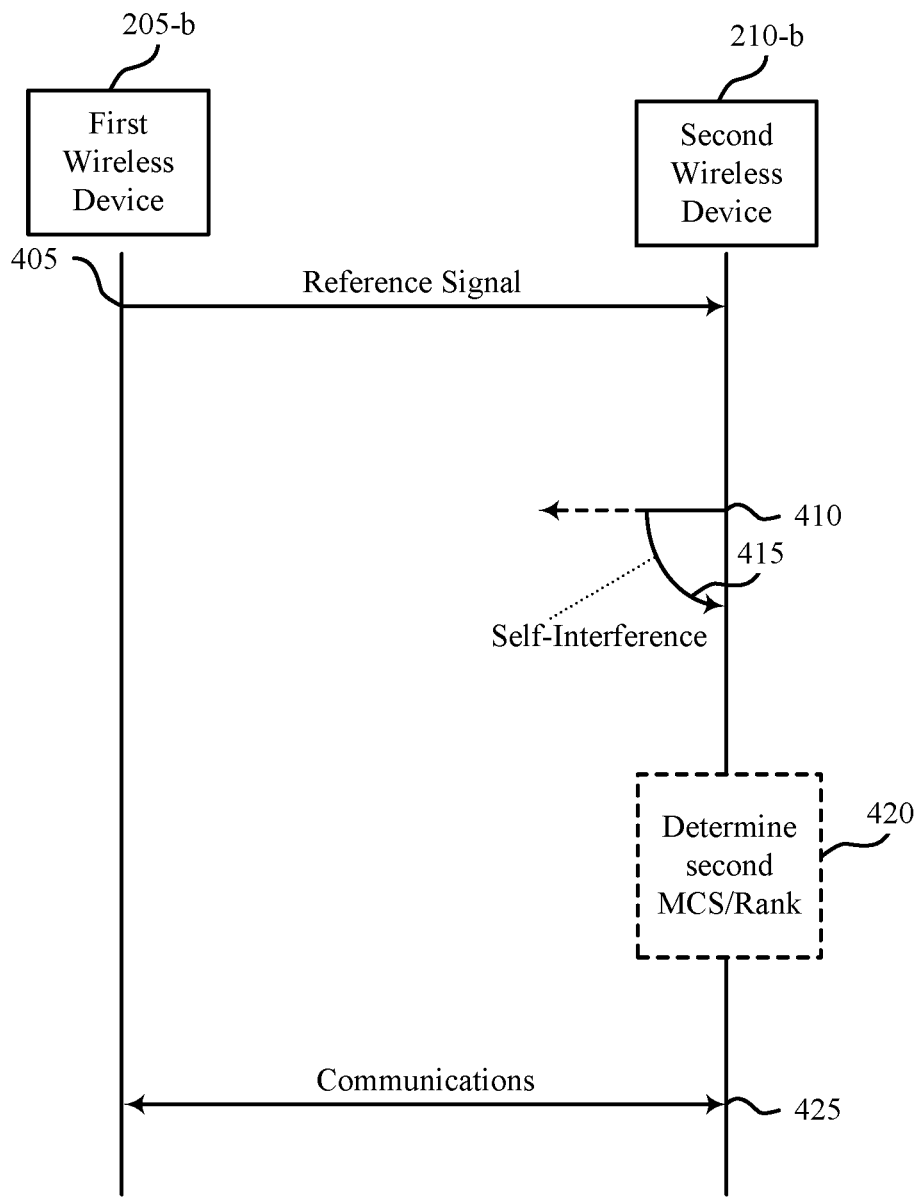
FIG. 4 illustrates an example of a process flow that supports measuring self-interference for full-duplex communications in accordance with aspects of the present disclosure.

FIG. 4 illustrates an example of a process flow 400 that supports measuring self-interference for full-duplex communications in accordance with aspects of the present disclosure. In some examples, process flow 400 may be implemented by one or more aspects of wireless communications systems 100 and/or 200. For instance, first wireless device 205-*b* may be an example of a first wireless device 205 as described with reference to FIG. 2 and/or a UE 115 or base station 105 as described with reference to FIG. 1. Additionally, second wireless device 210-*b* may be an example of a second wireless device 210 as described with reference to FIG. 2 and/or a UE 115 or base station 105 as described with reference to FIG. 1.

At 405, first wireless device 205-*b* may transmit, to second wireless device 210-*b*, a reference signal (e.g., a CSI-RS) over first resources. In some examples, the reference signal may be transmitted over a first carrier, where the first carrier is configured for full-duplex operations for the first wireless device 205-*b*.

At 410, second wireless device 210-*b* may transmit a first signal over second resources that overlap in time with the first resources for receiving the reference signal, where the first resources are of the first carrier. In some examples, the first resources may overlap in time with the second resources on a same carrier, bandwidth part, or set of resource blocks. In some such examples, the second resources may be of the first carrier. Alternatively, the first resources may overlap in time with the second resources on a different carrier, a different bandwidth part, or a different set of resource blocks. In some such examples, the second resources may be of a second carrier different than the first carrier.

At 415, second wireless device 210-b may receive at least portion of the energy of the first signal. In some examples, second wireless device 210-b may measure self-interference at second wireless device 210-b based on receiving the portion of the energy of the first signal.

At 420, second wireless device 210-b may determine an MCS and/or a rank based on receiving the reference signal and the at least the portion of the energy of the first signal. In some examples, determining the MCS and/or the rank is based on second wireless device 210-b measuring the self-interference.

At 425, second wireless device 210-b may communicate with first wireless device 405-b based on the determined MCS and/or rank.

Figure 5:
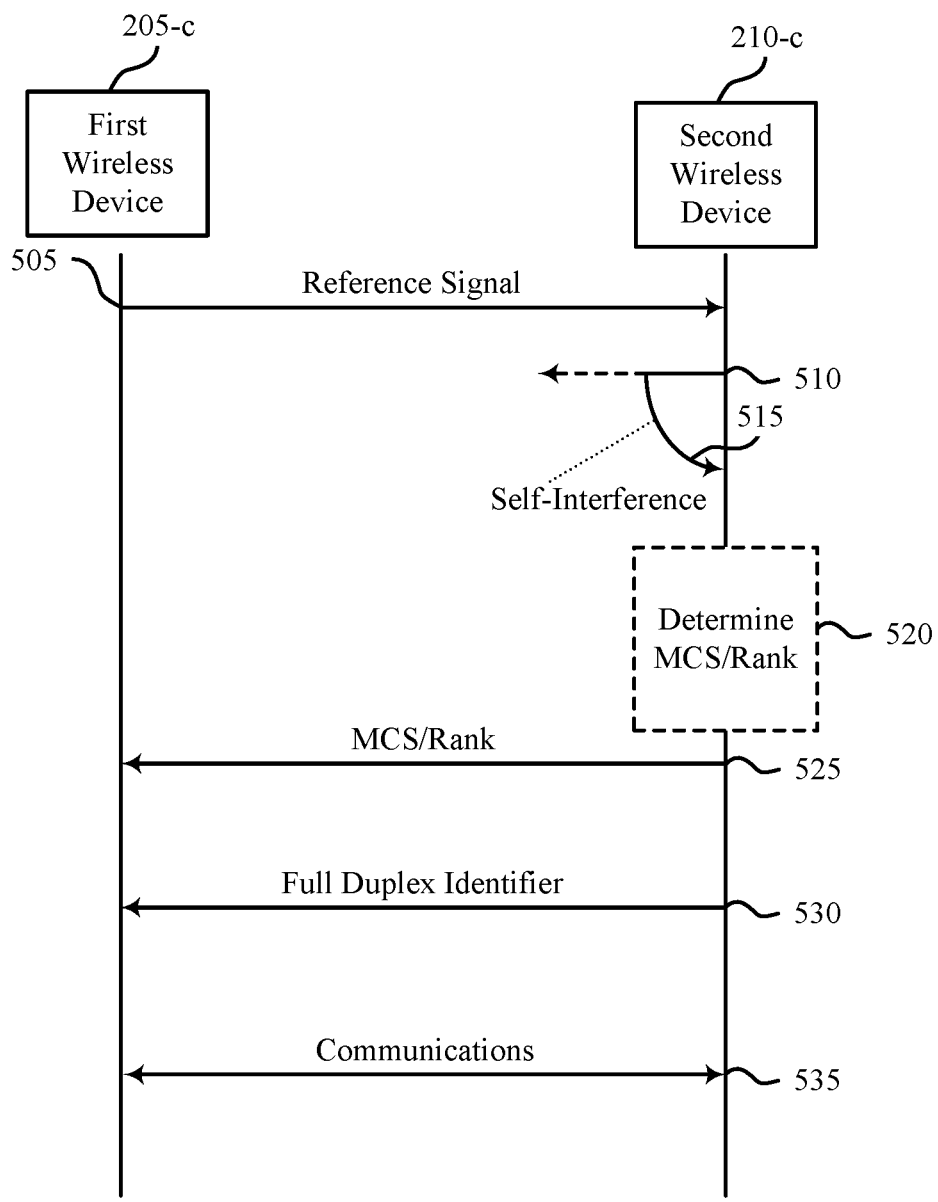
FIG. 5 illustrates an example of a process flow that supports measuring self-interference for full-duplex communications in accordance with aspects of the present disclosure.

FIG. 5 illustrates an example of a process flow 500 that supports measuring self-interference for full-duplex communications in accordance with aspects of the present disclosure. In some examples, process flow 500 may be implemented by one or more aspects of wireless communications systems 100 and/or 200. For instance, first wireless device 205-c may be an example of a first wireless device 205 as described with reference to FIG. 2 and/or a UE 115 or base station 105 as described with reference to FIG. 1. Additionally, second wireless device 210-c may be an example of a second wireless device 210 as described with reference to FIG. 2 and/or a UE 115 or base station 105 as described with reference to FIG. 1.

At 505, first wireless device 205-c may transmit, to second wireless device 210-c, a reference signal (e.g., a CSI-RS, an SRS).

At 510, second wireless device 210-c may transmit a first signal over a second resources that overlap in time with the first resources for receiving the reference signal. In some examples, the first resources may overlap in time with the second resources on a same carrier, bandwidth part, or set of resource blocks. Alternatively, the first resources may overlap in time with the second resources on a different carrier, a different bandwidth part, or a different set of resource blocks.

At 515, second wireless device 210-c may receive at least portion of the first signal. In some examples, second wireless device 210-c may measure self-interference at second wireless device 210-c based on receiving the portion of the first signal. In some examples, transmitting the first signal and receiving the at least the portion of the first signal may be included in performing full-duplex communications.

At 520, second wireless device 210-c may determine an MCS and/or a rank based on receiving the reference signal and the at least the portion of the first signal. In some examples, determining the MCS and/or the rank is based on second wireless device 210-c measuring the self-interference.

At 525, second wireless device 210-c may transmit, to first wireless device 205-c, a first indication of the MCS and/or the rank. Additionally, at 530, second wireless device 210-c may transmit, to first wireless device 205-c, a second indication that the MCS and/or the rank is associated with full-duplex communications at second wireless device 210-c. In some examples, the second indication for the MCS and the second indication for the rank may correspond to a same bit. In some examples, the first indication and the second indication may be conveyed via CSF. In some examples, the first indication and the second indication may be transmitted in a same CSF message.

At 535, second wireless device 210-c may communicate with first wireless device 205-c based on transmitting the first indication of the MCS and/or rank and the second indication that the MCS and/or the rank is associated with full-duplex communications at the first wireless device 205-c. For example, the second wireless device may send a first CSF message indicating a first MCS and/or first rank where the second indication indicates that the first MCS and/or rank is associated with half-duplex communications and a second CSF message indicating a second MCS and/or second rank where the second indication indicates that the second MCS and/or second rank is associated with full-duplex communications. The first wireless device 205-c may use the first MCS and/or first rank for communications during time periods (e.g., slots) where the second wireless device 210-c is not scheduled for full-duplex communications and may use the second MCS and/or second rank for communications during time periods (e.g., slots) where the second wireless device 210-c is scheduled for full-duplex communications.

Figure 6:
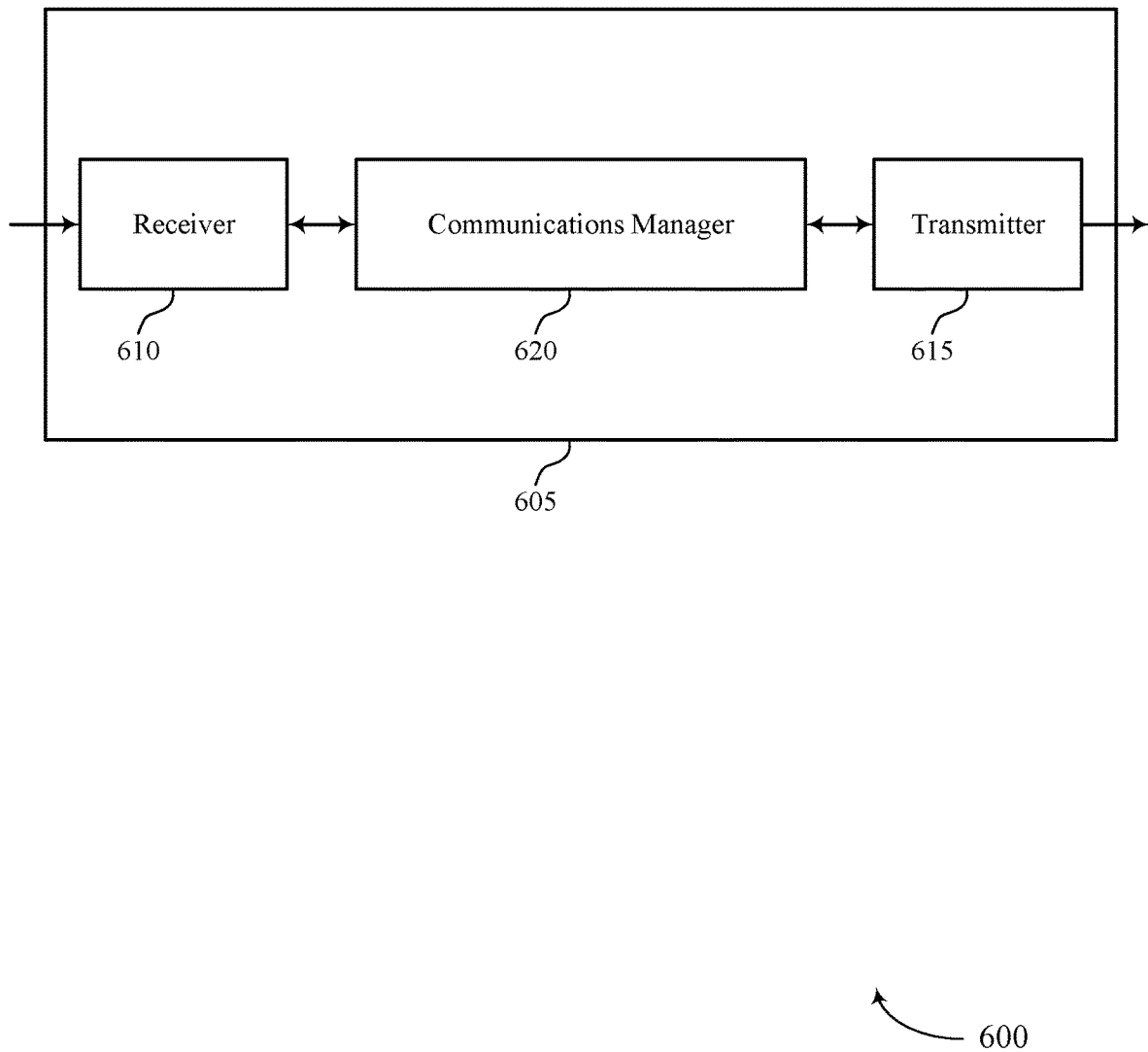
FIGS. 6 and 7 show block diagrams of devices that support measuring self-interference for full-duplex communications in accordance with aspects of the present disclosure.

FIG. 6 shows a block diagram 600 of a device 605 that supports measuring self-interference for full-duplex communications in accordance with aspects of the present disclosure. The device 605 may be an example of aspects of a UE 115, a base station 105, a first wireless device 205, or a second wireless device 210 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to measuring self-interference for full-duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to measuring self-interference for full-duplex communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of measuring self-interference for full-duplex communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for transmitting a reference signal to a second device. The communications manager 620 may be configured as or otherwise support a means for receiving, from the second device, an indication of a first modulation and coding scheme (MCS) for a first carrier based on transmitting the reference signal. The communications manager 620 may be configured as or otherwise support a means for receiving, from the second device, an interference report for the first carrier, where the interference report is associated with a measurement resource of the first carrier coinciding with a transmission resource for the second device over the first carrier or a second carrier. The communications manager 620 may be configured as or otherwise support a means for communicating with the second device based on a second MCS, the second MCS determined based on the first MCS and the interference report.

Additionally, or alternatively, the communications manager 620 may support wireless communication at a first device in accordance with examples as disclosed herein. For example, the communications manager 620 may be configured as or otherwise support a means for receiving, from a second device, a reference signal over first resources on a first carrier, wherein the first carrier is configured for full-duplex operations for the first device. The communications manager 620 may be configured as or otherwise support a means for transmitting a first signal over second resources that overlap in time with the first resources for receiving the reference signal. The communications manager 620 may be configured as or otherwise support a means for receiving at least a portion of the first signal. The communications manager 620 may be configured as or otherwise support a means for determining a modulation and coding scheme (MCS) based on receiving the reference signal and the at least the portion of the first signal. The communications manager 620 may be configured as or otherwise support a means for communicating with the second device based on the determined MCS.

Additionally, or alternatively, the communications manager 620 may support wireless communication at a first device in accordance with examples as disclosed herein. For example, the communications manager 620 may be configured as or otherwise support a means for receiving, from a second device, a reference signal. The communications manager 620 may be configured as or otherwise support a means for transmitting, to the second device, a first indication of a modulation and coding scheme (MCS) for a carrier and a second indication that the MCS is associated with full-duplex communications at the first device. The communications manager 620 may be configured as or otherwise support a means for communicating with the second device based on transmitting the first indication of the MCS and the second indication that the MCS is associated with the full-duplex communications at the first device.

Additionally, or alternatively, the communications manager 620 may support wireless communication at a first device in accordance with examples as disclosed herein. For example, the communications manager 620 may be configured as or otherwise support a means for transmitting, to a second device, a reference signal. The communications manager 620 may be configured as or otherwise support a means for receiving, from the second device, a first indication of a modulation and coding scheme (MCS) for a carrier and a second indication that the MCS is associated with full-duplex communications at the second device. The communications manager 620 may be configured as or otherwise support a means for communicating with the second device based on receiving the first indication of the MCS and the second indication that the MCS is associated with the full-duplex communications at the second device.

Additionally or alternatively, the communications manager 620 may support wireless communication at a first device in accordance with examples as disclosed herein. For instance, the communications manager 620 may be configured as or otherwise support a means for transmitting a reference signal to a second device over a first carrier, where the first carrier is configured for full-duplex operations for the first device. The communications manager 620 may be configured as or otherwise support a means for receiving, from the second device, an indication of channel state information for the first carrier based on transmitting the reference signal. The communications manager 620 may be configured as or otherwise support a means for receiving, from the second device, an interference report for the first carrier, wherein the interference report is associated with a measurement resource of the first carrier coinciding with a transmission resource for the second device over the first carrier or a second carrier. The communications manager 620 may be configured as or otherwise support a means for communicating with the second device based on an MCS, the MCS determined based on the channel state information and the interference report.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for the device 605 to adjust one or more communications parameters (e.g., MCS, rank) in accordance with changes in self-interference.

Figure 7:
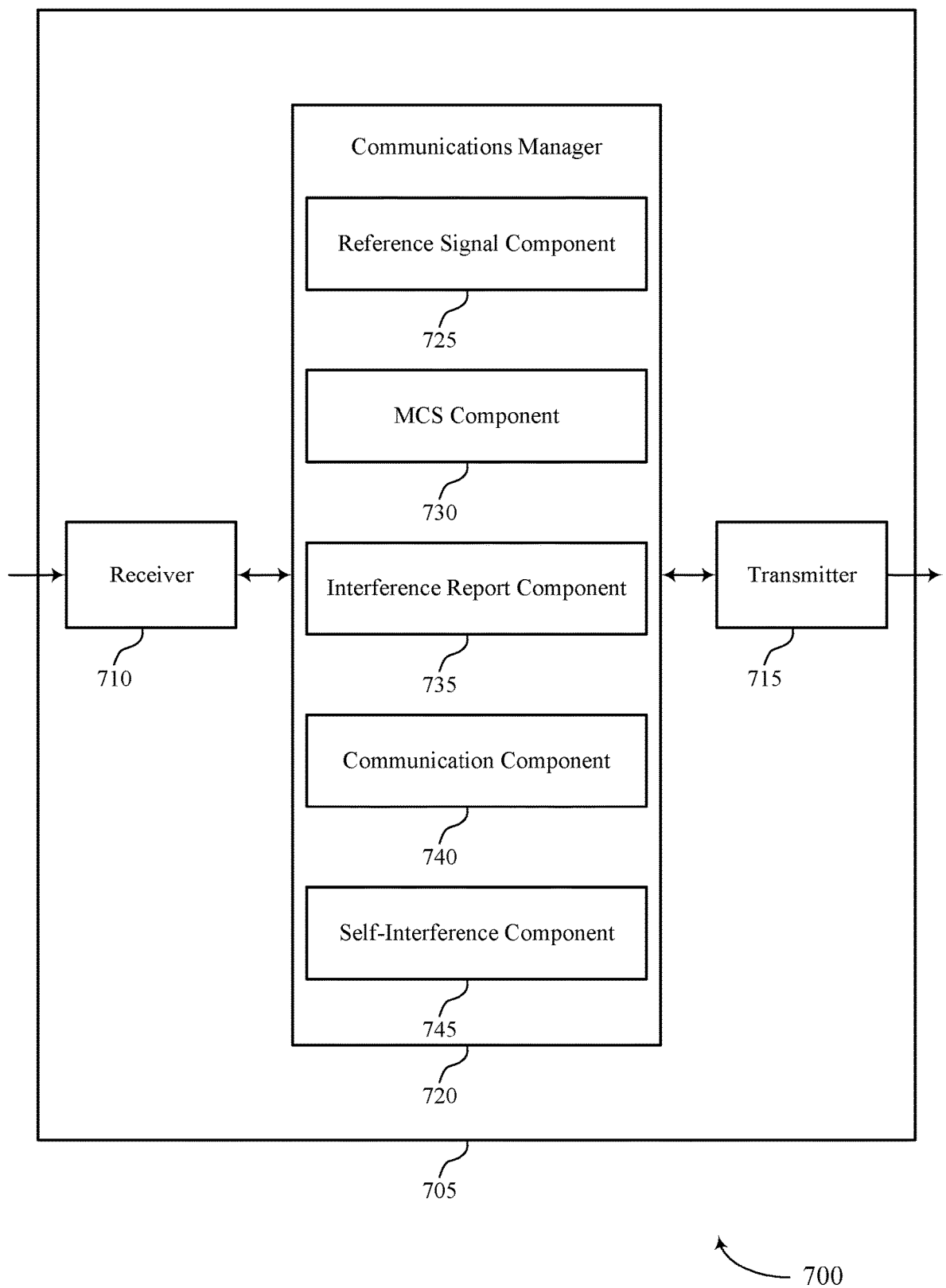

FIG. 7 shows a block diagram 700 of a device 705 that supports measuring self-interference for full-duplex communications in accordance with aspects of the present disclosure. The device 705 may be an example of aspects of a device 605 or a UE 115, a base station 105, a first wireless device 205, or a second wireless device 210 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to measuring self-interference for full-duplex communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to measuring self-interference for full-duplex communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of measuring self-interference for full-duplex communications as described herein. For example, the communications manager 720 may include a reference signal component 725, an MCS component 730, an interference report component 735, a communication component 740, a self-interference component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The reference signal component 725 may be configured as or otherwise support a means for transmitting a reference signal to a second device. The MCS component 730 may be configured as or otherwise support a means for receiving, from the second device, an indication of a first modulation and coding scheme (MCS) for a first carrier based on transmitting the reference signal. The interference report component 735 may be configured as or otherwise support a means for receiving, from the second device, an interference report for the first carrier, where the interference report is associated with a measurement resource of the first carrier coinciding with a transmission resource for the second device over the first carrier or a second carrier. The communication component 740 may be configured as or otherwise support a means for communicating with the second device based on a second MCS, the second MCS determined based on the first MCS and the interference report.

Additionally, or alternatively, the communications manager 720 may support wireless communication at a first device in accordance with examples as disclosed herein. The reference signal component 725 may be configured as or otherwise support a means for receiving, from a second device, a reference signal over first resources of a first carrier, where the first carrier is configured for full-duplex operations for the first device. The self-interference component 745 may be configured as or otherwise support a means for transmitting a first signal over second resources that overlap in time with the first resources for receiving the reference signal. The self-interference component 745 may be configured as or otherwise support a means for receiving at least a portion of the first signal. The MCS component 730 may be configured as or otherwise support a means for determining a modulation and coding scheme (MCS) based on receiving the reference signal and the at least the portion of the first signal. The communication component 740 may be configured as or otherwise support a means for communicating with the second device based on the determined MCS.

Additionally, or alternatively, the communications manager 720 may support wireless communication at a first device in accordance with examples as disclosed herein. The reference signal component 725 may be configured as or otherwise support a means for receiving, from a second device, a reference signal. The MCS component 730 may be configured as or otherwise support a means for transmitting, to the second device, a first indication of a modulation and coding scheme (MCS) for a carrier and a second indication that the MCS is associated with full-duplex communications at the first device. The communication component 740 may be configured as or otherwise support a means for communicating with the second device based on transmitting the first indication of the MCS and the second indication that the MCS is associated with the full-duplex communications at the first device.

Additionally, or alternatively, the communications manager 720 may support wireless communication at a first device in accordance with examples as disclosed herein. The reference signal component 725 may be configured as or otherwise support a means for transmitting, to a second device, a reference signal. The MCS component 730 may be configured as or otherwise support a means for receiving, from the second device, a first indication of a modulation and coding scheme (MCS) for a carrier and a second indication that the MCS is associated with full-duplex communications at the second device. The communication component 740 may be configured as or otherwise support a means for communicating with the second device based on receiving the first indication of the MCS and the second indication that the MCS is associated with the full-duplex communications at the second device.

Additionally or alternatively, the communications manager 720 may support wireless communications at a first device in accordance with examples as disclosed herein. The reference signal component 725 may be configured as or otherwise support a means for transmitting a reference signal to a second device over a first carrier, where the first carrier is configured for full-duplex operations for the first device. The MCS component 730 may be configured as or otherwise support a means for receiving, from the second device, an indication of channel state information for the first carrier based on transmitting the reference signal. The interference report component 735 may be configured as or otherwise support a means for receiving, from the second device, an interference report for the first carrier, where the interference report is associated with a measurement resource of the first carrier coinciding with a transmission resource for the second device over the first carrier or a second carrier. The communication component 740 may be configured as or otherwise support a means for communicating with the second device based on a MCS, the MCS determined based on the channel state information and the interference report.

Figure 8:
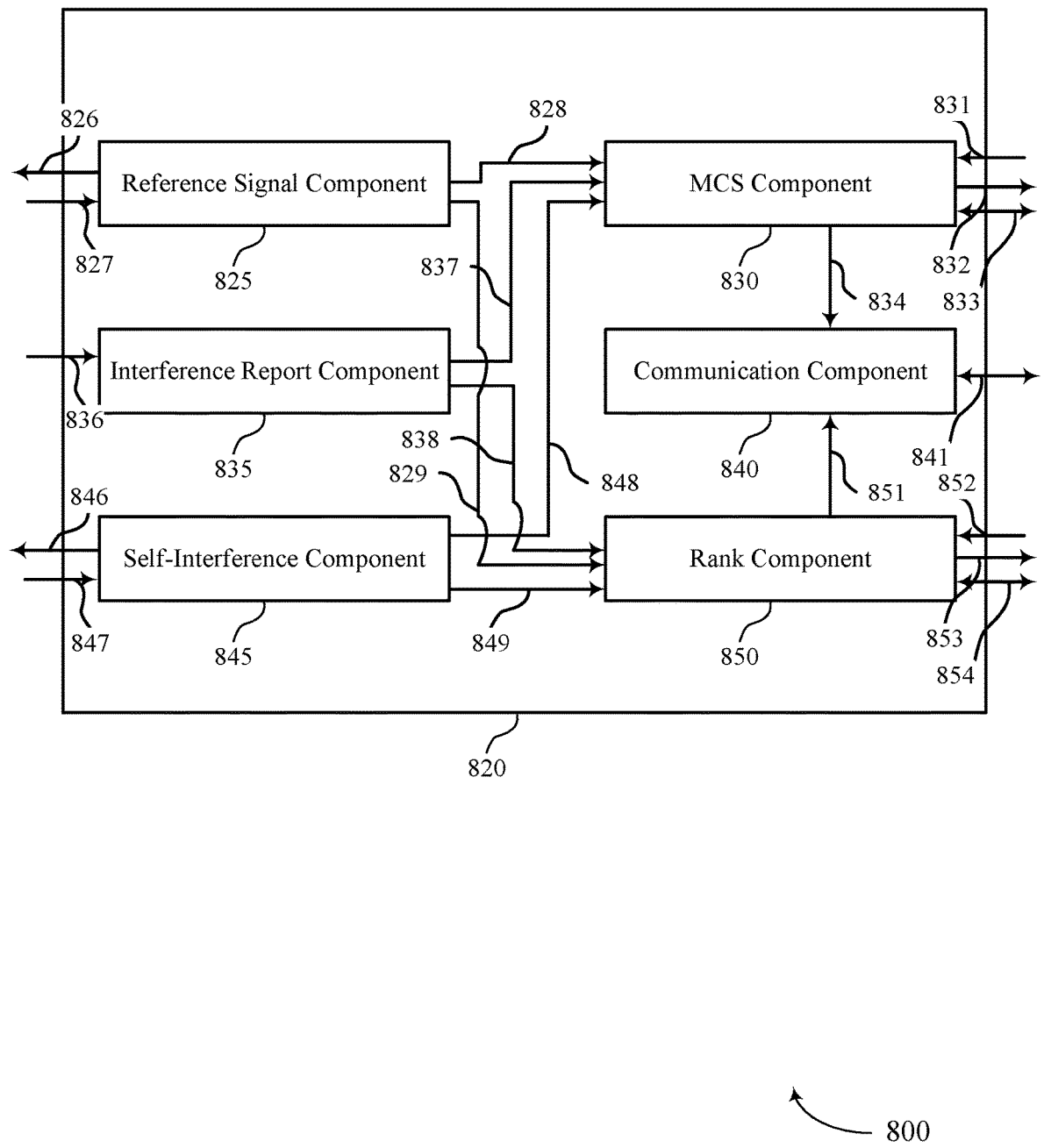
FIG. 8 shows a block diagram of a communications manager that supports measuring self-interference for full-duplex communications in accordance with aspects of the present disclosure.

FIG. 8 shows a block diagram 800 of a communications manager 820 that supports measuring self-interference for full-duplex communications in accordance with aspects of the present disclosure. The communications manager 820 may be an example of aspects of a communications manager 620, a communications manager 720, or both, as described herein. The communications manager 820, or various components thereof, may be an example of means for performing various aspects of measuring self-interference for full-duplex communications as described herein. For example, the communications manager 820 may include a reference signal component 825, an MCS component 830, an interference report component 835, a communication component 840, a self-interference component 845, a rank component 850, or any combination thereof. Each of these components may communicate, directly or indirectly, with one another (e.g., via one or more buses).

The communications manager 820 may support wireless communication at a first device in accordance with examples as disclosed herein. The reference signal component 825 may be configured as or otherwise support a means for transmitting a reference signal 826 to a second device. The MCS component 830 may be configured as or otherwise support a means for receiving, from the second device, an indication 831 of a first modulation and coding scheme (MCS) for a first carrier based on transmitting the reference signal. The interference report component 835 may be configured as or otherwise support a means for receiving, from the second device, an interference report 836 for the first carrier, where the interference report 836 is associated with a measurement resource of the first carrier coinciding with a transmission resource for the second device over the first carrier or a second carrier. The communication component 840 may be configured as or otherwise support a means for communicating (e.g., a transmission 841) with the second device based on a second MCS, the second MCS determined based on the first MCS and the interference report. In some examples, the interference report component 835 may transmit an indication 837 of the interference report to MCS component 830. After determining the second MCS, the MCS component 830 may transmit an indication 834 of the second MCS to communication component 840.

In some examples, the rank component 850 may be configured as or otherwise support a means for receiving, from the second device, an indication 852 of a first rank based on transmitting the reference signal. In some examples, the communication component 840 may be configured as or otherwise support a means for communicating with the second device based on a second rank, the second rank determined based on the first rank and the interference report. In some examples, the interference report component 835 may transmit an indication 838 of the interference report to rank component 850. After determining the second rank, rank component 850 may transmit, to interference report component 835, an indication 851, of the second rank to communication component 840.

In some examples, the communication component 840 may be configured as or otherwise support a means for communicating with the second device over second resources based on the first rank, where communicating based on the first rank is based on the second device being configured to perform half-duplex communications for the second resources. In such examples, the rank component 850 may transmit an indication 851 of the first rank to communication component 840.

In some examples, communicating based on the second MCS is based on the second device being configured to perform full-duplex communications for a resource associated with the communicating.

In some examples, the communication component 840 may be configured as or otherwise support a means for communicating with the second device over second resources based on the first MCS, where communicating based on the first MCS is based on the second device being configured to perform half-duplex communications for the second resources. In such examples, the rank component 850 may transmit an indication 851 of the first MCS to communication component 840.

In some examples, to support receiving the indication of the first MCS, the MCS component 830 may be configured as or otherwise support a means for receiving channel state feedback including the indication of the first MCS.

In some examples, to support receiving the interference report, the interference report component 835 may be configured as or otherwise support a means for receiving a cross-link interference report associated with the measurement resource of the first carrier coinciding with the transmission resource for the second device.

In some examples, the reference signal is scheduled to be transmitted over a resource that overlaps with the transmission resource in time and frequency. In some examples, the measurement resource coincides with the transmission resource over the first carrier.

In some examples, the reference signal is scheduled to be transmitted over a resource of the first carrier that overlaps with the transmission resource in time. In some examples, the transmission resource is over the second carrier.

In some examples, the first device includes a base station and the second device includes a UE.

Additionally, or alternatively, the communications manager 820 may support wireless communication at a first device in accordance with examples as disclosed herein. In some examples, the reference signal component 825 may be configured as or otherwise support a means for receiving, from a second device, a reference signal 827 over first resources of a first carrier, where the first carrier is configured for full-duplex operations for the first device. The self-interference component 845 may be configured as or otherwise support a means for transmitting a first signal 846 over second resources that overlaps in time with the first resources for receiving the reference signal 827. In some examples, the self-interference component 845 may be configured as or otherwise support a means for receiving at least a portion 847 of the first signal 846. In some examples, the MCS component 830 may be configured as or otherwise support a means for determining a modulation and coding scheme (MCS) based on receiving the reference signal and the at least the portion of the first signal. In some examples, the communication component 840 may be configured as or otherwise support a means for communicating with the second device based on the determined MCS. In some such examples, the reference signal component 825 may transmit an indication 828 of the reference signal to MCS component 830 and self-interference component 845 may transmit an indication 848 of the at least the portion of the first signal to MCS component 830. Additionally, MCS component 830 may transmit an indication 832 of the determined MCS.

In some examples, the rank component 850 may be configured as or otherwise support a means for determining a rank based on receiving the reference signal and the at least the portion of the first signal, where communicating with the second device is based on the determined rank. In some such examples, the reference signal component 825 may transmit an indication 829 of the reference signal to rank component 850 and self-interference component 845 may transmit an indication 849 of the at least the portion of the first signal to rank component 850. Additionally, rank component 850 may transmit an indication 853 of the determined rank.

In some examples, the self-interference component 845 may be configured as or otherwise support a means for measuring self-interference at the first device based on receiving the at least the portion of the first signal, where determining the MCS is based on measuring the self-interference.

In some examples, the first resources overlap in time with the second resources on a same carrier.

In some examples, the first resources overlap in time with the second resources on a different carrier.

In some examples, the second resources are of the first carrier.

In some examples, the second resources are of a second carrier different than the first carrier.

In some examples, the first device includes a base station and the second device includes a UE.

Additionally, or alternatively, the communications manager 820 may support wireless communication at a first device in accordance with examples as disclosed herein. In some examples, the reference signal component 825 may be configured as or otherwise support a means for receiving, from a second device, a reference signal 827. In some examples, the MCS component 830 may be configured as or otherwise support a means for transmitting, to the second device, a first indication 832 of a modulation and coding scheme (MCS) for a carrier and a second indication 833 that the MCS is associated with full-duplex communications at the first device. In some such examples, the reference signal component 825 may transmit an indication 828 of the reference signal to MCS component 830. In some examples, the communication component 840 may be configured as or otherwise support a means for communicating with the second device based on transmitting the first indication of the MCS and the second indication that the MCS is associated with the full-duplex communications at the first device. In some such examples, the MCS component 830 may transmit an indication 834 of the MCS to the communication component 840.

In some examples, the rank component 850 may be configured as or otherwise support a means for transmitting, to the second device, a third indication 853 of a rank and a fourth indication 854 that the rank is associated with full-duplex communications on the carrier at the first device, where communicating with the second device is based on transmitting the third indication 853 of the rank and the fourth indication 854 that the rank is associated with full-duplex communications at the first device. In some examples, the reference signal component 825 may transmit an indication 829 of the reference signal to rank component 850. In some such examples, rank component 850 may transmit an indication 851 of the rank to communication component 840.

In some examples, the second indication 833 and the fourth indication 843 correspond to a same bit.

In some examples, the self-interference component 845 may be configured as or otherwise support a means for performing full-duplex communications at the first device, where performing the full-duplex communications includes transmitting a signal on the carrier and receiving at least a portion of the signal at the first device, and where transmitting the first indication and the second indication is based on receiving the at least the portion of the signal.

In some examples, the at least the portion of the signal is received on the carrier.

In some examples, the at least the portion of the signal is received on a second carrier different than the carrier.

In some examples, to support transmitting the first indication and the second indication, the MCS component 830 may be configured as or otherwise support a means for transmitting, to the second device, channel state feedback that includes the first indication and the second indication.

In some examples, to support receiving the reference signal, the reference signal component 825 may be configured as or otherwise support a means for receiving, from the second device, a channel state information reference signal.

In some examples, the first device includes a UE and the second device includes a base station.

Additionally, or alternatively, the communications manager 820 may support wireless communication at a first device in accordance with examples as disclosed herein. In some examples, the reference signal component 825 may be configured as or otherwise support a means for transmitting, to a second device, a reference signal 826. In some examples, the MCS component 830 may be configured as or otherwise support a means for receiving, from the second device, a first indication 831 of a modulation and coding scheme (MCS) for a carrier and a second indication 833 that the MCS is associated with full-duplex communications at the second device. In some examples, the communication component 840 may be configured as or otherwise support a means for communicating with the second device based on receiving the first indication 831 of the MCS and the second indication 833 that the MCS is associated with the full-duplex communications at the second device. In some examples, the MCS component 830 may transmit an indication 834 of the first and second indications to communication component 840.

In some examples, the rank component 850 may be configured as or otherwise support a means for receiving, from the second device, a third indication 852 of a rank and a fourth indication 854 that the rank is associated with full-duplex communications on the carrier at the first device, where communicating with the second device is based on receiving the third indication 852 of the rank and the fourth indication 854 that the rank is associated with full-duplex communications at the second device. In some examples, the rank component 850 may transmit an indication 851 of the third and fourth indications to communication component 840.

In some examples, the second indication 833 and the fourth indication 854 correspond to a same bit.

In some examples, to support receiving the first indication and the second indication, the MCS component 830 may be configured as or otherwise support a means for receiving, from the second device, channel state feedback that includes the first indication and the second indication.

In some examples, the first device includes a base station and the second device includes a UE.

The communications manager 820 may support wireless communication at a first device in accordance with examples as disclosed herein. The reference signal component 825 may be configured as or otherwise support a means for transmitting a reference signal 826 to a second device over a first carrier, where the first carrier is configured for full-duplex operations for the first device. The MCS component 830 may be configured as or otherwise support a means for receiving, from the second device, an indication 831 of channel state information for the first carrier based on transmitting the reference signal. The interference report component 835 may be configured as or otherwise support a means for receiving, from the second device, an interference report 836 for the first carrier, where the interference report 836 is associated with a measurement resource of the first carrier coinciding with a transmission resource for the second device over the first carrier or a second carrier. The communication component 840 may be configured as or otherwise support a means for communicating (e.g., a transmission 841) with the second device based on an MCS, the MCS determined based on the channel state information and the interference report. In some examples, the interference report component 835 may transmit an indication 837 of the interference report to MCS component 830. After determining the MCS, the MCS component 830 may transmit an indication 834 of the MCS to communication component 840.

In some examples, the rank component 850 may be configured as or otherwise support a means for communicating with the second device based on a rank, the rank determined based on the channel state information and the interference report. In some such examples, the channel state information may include an indication of a second rank, where the rank is determined based on the second rank. In some examples, the communication component 840 may be configured as or otherwise support a means for communicating with the second device based on the rank, the rank determined based on the channel state information and the interference report. In some examples, the interference report component 835 may transmit an indication 838 of the interference report to rank component 850. After determining the rank, rank component 850 may transmit, to interference report component 835, an indication 851, of the rank to communication component 840.

In some examples, the communication component 840 may be configured as or otherwise support a means for communicating with the second device over second resources based on the second rank, where communicating based on the second rank is based on the second device being configured to perform half-duplex communications for the second resources. In such examples, the rank component 850 may transmit an indication 851 of the second rank to communication component 840.

In some examples, communicating based on the MCS is based on the second device being configured to perform full-duplex communications for a resource associated with the communicating.

In some examples, the channel state information includes a second MCS, the MCS determined based on the second MCS.

In some examples, the communication component 840 may be configured as or otherwise support a means for communicating with the second device over second resources based on the second MCS, where communicating based on the second MCS is based on the second device being configured to perform half-duplex communications for the second resources. In such examples, the rank component 850 may transmit an indication 851 of the first MCS to communication component 840.

In some examples, to support receiving the interference report, the interference report component 835 may be configured as or otherwise support a means for receiving a cross-link interference report associated with the measurement resource of the first carrier coinciding with the transmission resource for the second device.

In some examples, the reference signal is scheduled to be transmitted over a resource that overlaps with the transmission resource in time and frequency. In some examples, the measurement resource coincides with the transmission resource over the first carrier.

In some examples, the reference signal is scheduled to be transmitted over a resource of the first carrier that overlaps with the transmission resource in time. In some examples, the transmission resource is over the second carrier.

In some examples, the first device includes a base station and the second device includes a UE.

In some examples, the indication of the channel state information and the interference report are multiplexed in a same message.

Figure 9:
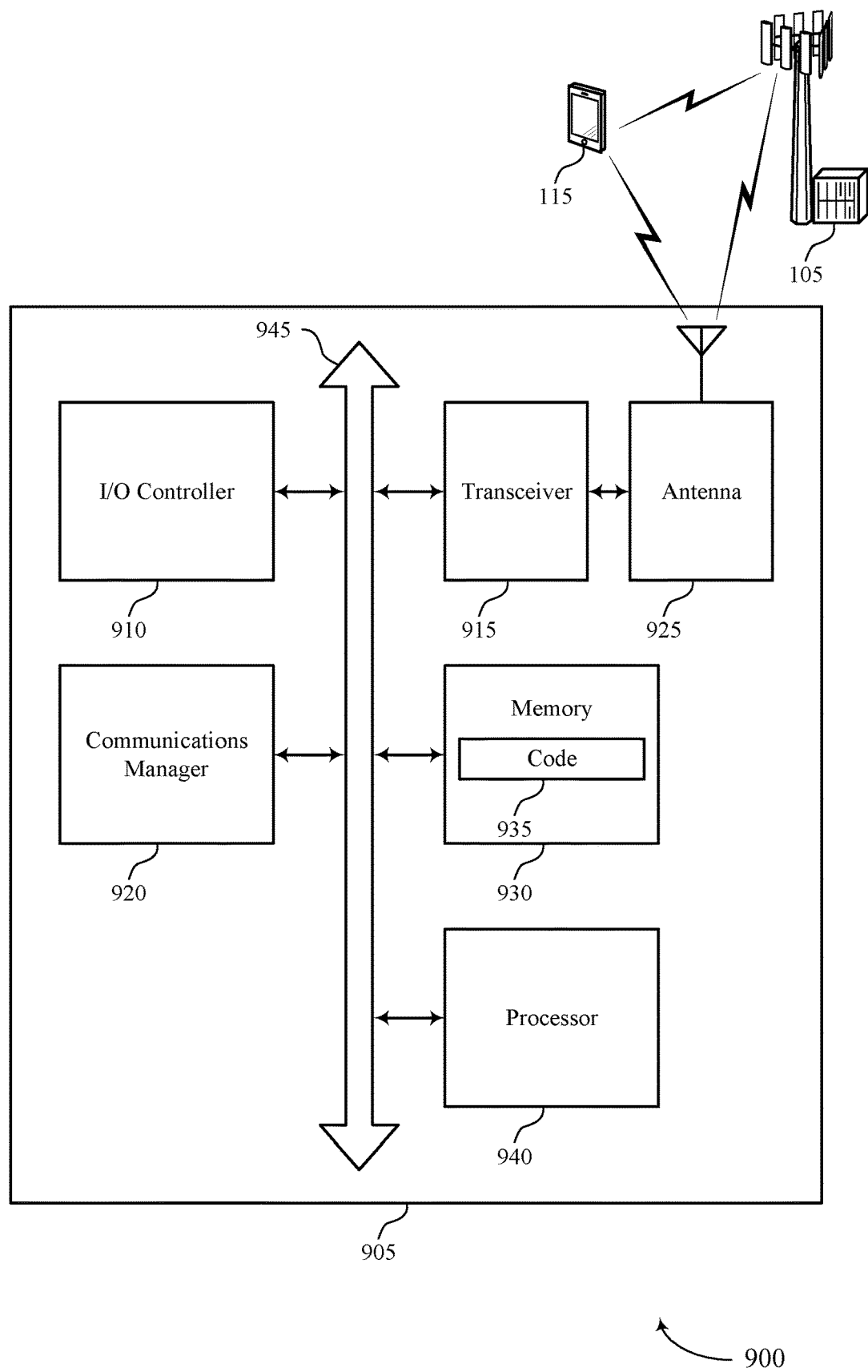
FIG. 9 shows a diagram of a system including a device that supports measuring self-interference for full-duplex communications in accordance with aspects of the present disclosure.

FIG. 9 shows a diagram of a system 900 including a device 905 that supports measuring self-interference for full-duplex communications in accordance with aspects of the present disclosure. The device 905 may be an example of or include the components of a device 605, a device 705, or a UE 115, a base station 105, a first wireless device 205, or a second wireless device 210 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting measuring self-interference for full-duplex communications). For example, the device 905 or a component of the device 905 may include a processor 940 and memory 930 coupled to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for transmitting a reference signal to a second device. The communications manager 920 may be configured as or otherwise support a means for receiving, from the second device, an indication of a first modulation and coding scheme (MCS) for a first carrier based on transmitting the reference signal. The communications manager 920 may be configured as or otherwise support a means for receiving, from the second device, an interference report for the first carrier, where the interference report is associated with a measurement resource of the first carrier coinciding with a transmission resource for the second device over the first carrier or a second carrier. The communications manager 920 may be configured as or otherwise support a means for communicating with the second device based on a second MCS, the second MCS determined based on the first MCS and the interference report.

Additionally, or alternatively, the communications manager 920 may support wireless communication at a first device in accordance with examples as disclosed herein. For example, the communications manager 920 may be configured as or otherwise support a means for receiving, from a second device, a reference signal over a first resources of a first carrier, where the first carrier is configured for full-duplex operations for the first device. The communications manager 920 may be configured as or otherwise support a means for transmitting a first signal over a second resources that overlaps in time with the first resources for receiving the reference signal. The communications manager 920 may be configured as or otherwise support a means for receiving at least a portion of the first signal. The communications manager 920 may be configured as or otherwise support a means for determining a modulation and coding scheme (MCS) based on receiving the reference signal and the at least the portion of the first signal. The communications manager 920 may be configured as or otherwise support a means for communicating with the second device based on the determined MCS.

Additionally, or alternatively, the communications manager 920 may support wireless communication at a first device in accordance with examples as disclosed herein. For example, the communications manager 920 may be configured as or otherwise support a means for receiving, from a second device, a reference signal. The communications manager 920 may be configured as or otherwise support a means for transmitting, to the second device, a first indication of a modulation and coding scheme (MCS) for a carrier and a second indication that the MCS is associated with full-duplex communications at the first device. The communications manager 920 may be configured as or otherwise support a means for communicating with the second device based on transmitting the first indication of the MCS and the second indication that the MCS is associated with the full-duplex communications at the first device.

Additionally, or alternatively, the communications manager 920 may support wireless communication at a first device in accordance with examples as disclosed herein. For example, the communications manager 920 may be configured as or otherwise support a means for transmitting, to a second device, a reference signal. The communications manager 920 may be configured as or otherwise support a means for receiving, from the second device, a first indication of a modulation and coding scheme (MCS) for a carrier and a second indication that the MCS is associated with full-duplex communications at the second device. The communications manager 920 may be configured as or otherwise support a means for communicating with the second device based on receiving the first indication of the MCS and the second indication that the MCS is associated with the full-duplex communications at the second device.

Additionally or alternatively, the communications manager 920 may support wireless communication at a first device in accordance with examples as disclosed herein. For instance, the communications manager 920 may be configured as or otherwise support a means for transmitting a reference signal to a second device over a first carrier, where the first carrier is configured for full-duplex operations for the first device. The communications manager 920 may be configured as or otherwise support a means for receiving, from the second device, an indication of channel state information for the first carrier based on transmitting the reference signal. The communications manager 920 may be configured as or otherwise support a means for receiving, from the second device, an interference report for the first carrier, wherein the interference report is associated with a measurement resource of the first carrier coinciding with a transmission resource for the second device over the first carrier or a second carrier. The communications manager 920 may be configured as or otherwise support a means for communicating with the second device based on an MCS, the MCS determined based on the channel state information and the interference report By including or configuring the communications manager 920 in accordance with examples as described herein, the device 905 may support techniques for the device to adjust one or more communications parameter (e.g., MCS, rank) in accordance with changes in self-interference.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of measuring self-interference for full-duplex communications as described herein, or the processor 940 and the memory 930 may be otherwise configured to perform or support such operations.

Figure 10:
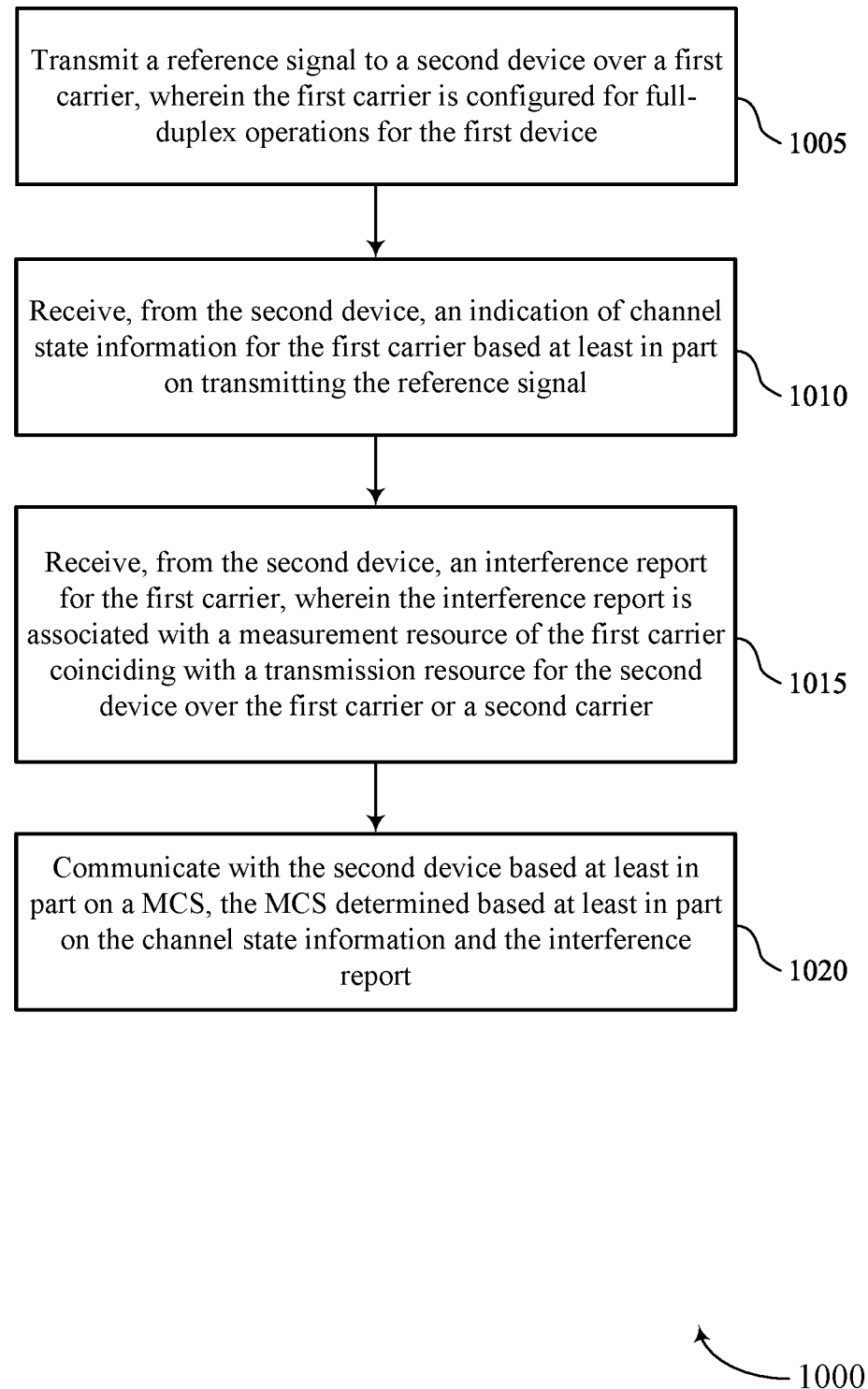
FIGS. 10 through 14 show flowcharts illustrating methods that support measuring self-interference for full-duplex communications in accordance with aspects of the present disclosure.

FIG. 10 shows a flowchart illustrating a method 1000 that supports measuring self-interference for full-duplex communications in accordance with aspects of the present disclosure. The operations of the method 1000 may be implemented by a UE, a base station, a wireless device, or its components as described herein. For example, the operations of the method 1000 may be performed by a UE 115, a base station 105, a first wireless device 205, or a second wireless device 210 as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1005, the method may include transmitting a reference signal to a second device over a first carrier, wherein the first carrier is configured for full-duplex operations for the first device. Transmitting the reference signal may include identifying time-frequency resources over which the reference signal is to be transmitted and transmitting the reference signal over the time-frequency resources. The operations of 1005 may be performed in accordance with examples as disclosed herein. In some examples, aspects of the operations of 1005 may be performed by a reference signal component 825 as described with reference to FIG. 8.

At 1010, the method may include receiving, from the second device, an indication of channel state information for the first carrier based at least in part on transmitting the reference signal. Receiving the channel state information may include identifying time-frequency resources over which the channel state information is to be received and receiving the channel state information over the time-frequency resources. The operations of 1010 may be performed in accordance with examples as disclosed herein. In some examples, aspects of the operations of 1010 may be performed by an MCS component 830 as described with reference to FIG. 8.

At 1015, the method may include receiving, from the second device, an interference report for the first carrier, where the interference report is associated with a measurement resource of the first carrier coinciding with a transmission resource for the second device over the first carrier or a second carrier. Receiving the interference report may include identifying time-frequency resources over which the interference report is to be received and receiving the interference report over the time-frequency resources. The operations of 1015 may be performed in accordance with examples as disclosed herein. In some examples, aspects of the operations of 1015 may be performed by an interference report component 835 as described with reference to FIG. 8.

At 1020, the method may include communicating with the second device based on an MCS, the MCS determined based on the channel state information and the interference report. Communicating may include identifying time-frequency resources over which communications is to occur and communicating over the time-frequency resources. The operations of 1020 may be performed in accordance with examples as disclosed herein. In some examples, aspects of the operations of 1020 may be performed by a communication component 840 as described with reference to FIG. 8.

Figure 11:
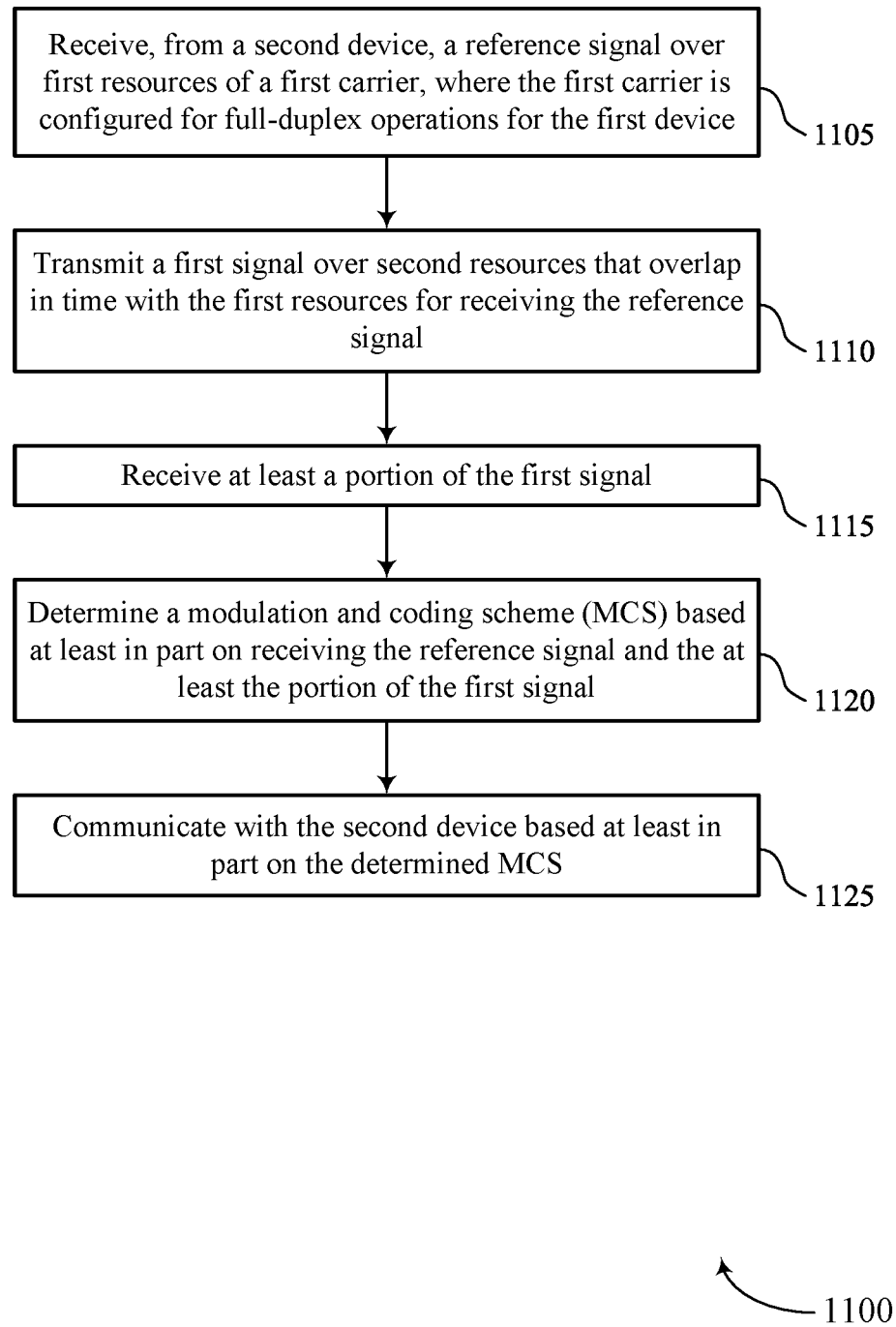

FIG. 11 shows a flowchart illustrating a method 1100 that supports measuring self-interference for full-duplex communications in accordance with aspects of the present disclosure. The operations of the method 1100 may be implemented by a UE, a base station, a wireless device, or its components as described herein. For example, the operations of the method 1100 may be performed by a UE 115, a base station 105, a first wireless device 205, or a second wireless device 210 as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1105, the method may include receiving, from a second device, a reference signal over first resources of a first carrier, where the first carrier is configured for full-duplex operations for the first device. Receiving the reference signal may include identifying time-frequency resources over which the reference signal is to be received and receiving the reference signal over the time-frequency resources. The operations of 1105 may be performed in accordance with examples as disclosed herein. In some examples, aspects of the operations of 1105 may be performed by a reference signal component 825 as described with reference to FIG. 8.

At 1110, the method may include transmitting a first signal over second resources that overlap in time with the first resources for receiving the reference signal. Transmitting the first signal may include identifying time-frequency resources over which the first signal is to be transmitted and transmitting the first signal over the time-frequency resources. The operations of 1110 may be performed in accordance with examples as disclosed herein. In some examples, aspects of the operations of 1110 may be performed by a self-interference component 845 as described with reference to FIG. 8.

At 1115, the method may include receiving at least a portion of the first signal. Receiving the at least the portion of the first signal may include identifying time-frequency resources over which the at least the portion of the first signal is to be received and receiving the at least the portion of the first signal over the time-frequency resources. The operations of 1115 may be performed in accordance with examples as disclosed herein. In some examples, aspects of the operations of 1115 may be performed by a self-interference component 845 as described with reference to FIG. 8.

At 1120, the method may include determining a modulation and coding scheme (MCS) based on receiving the reference signal and the at least the portion of the first signal. Determining the MCS may include determining a first measurement value associated with the reference signal and a second measurement value associated with the at least the portion of the first signal and combining the first and second measurement values. The operations of 1120 may be performed in accordance with examples as disclosed herein. In some examples, aspects of the operations of 1120 may be performed by an MCS component 830 as described with reference to FIG. 8.

At 1125, the method may include communicating with the second device based on the determined MCS. The operations of 1125 may be performed in accordance with examples as disclosed herein. Communicating may include identifying time-frequency resources over which the communications is to occur and communicating over the time-frequency resources. In some examples, aspects of the operations of 1125 may be performed by a communication component 840 as described with reference to FIG. 8.

Figure 12:
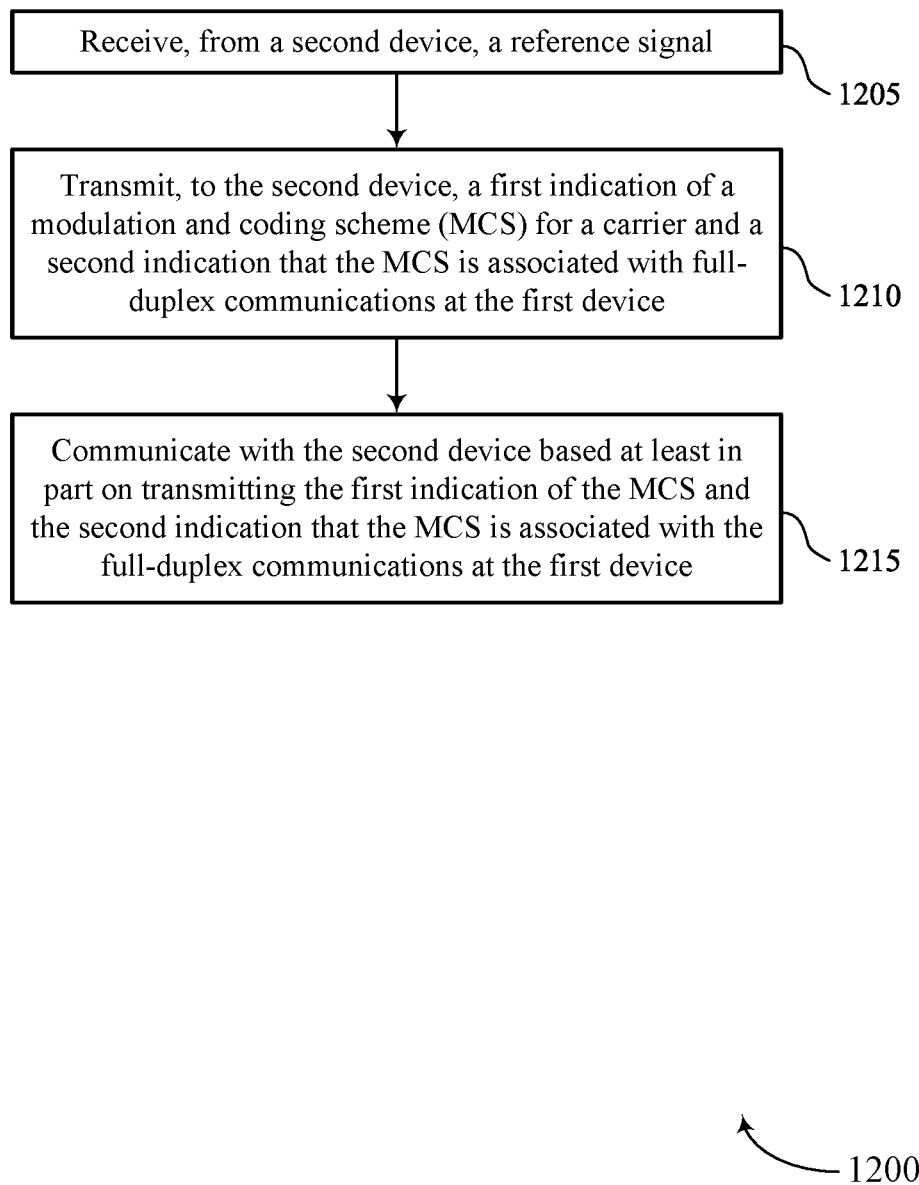

FIG. 12 shows a flowchart illustrating a method 1200 that supports measuring self-interference for full-duplex communications in accordance with aspects of the present disclosure. The operations of the method 1200 may be implemented by a UE, a base station, a wireless device, or its components as described herein. For example, the operations of the method 1200 may be performed by a UE 115, a base station 105, a first wireless device 205, or a second wireless device 210 as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1205, the method may include receiving, from a second device, a reference signal. Receiving the reference signal may include identifying time-frequency resources over which the reference signal is to be received and receiving the reference signal over the time-frequency resources. The operations of 1205 may be performed in accordance with examples as disclosed herein. In some examples, aspects of the operations of 1205 may be performed by a reference signal component 825 as described with reference to FIG. 8.

At 1210, the method may include transmitting, to the second device, a first indication of a modulation and coding scheme (MCS) for a carrier and a second indication that the MCS is associated with full-duplex communications at the first device. The operations of 1210 may be performed in accordance with examples as disclosed herein. Transmitting the first and second indications may include identifying time-frequency resources over which the first and second indications are to be transmitted and transmitting the first and second indications over the time-frequency resources. In some examples, aspects of the operations of 1210 may be performed by an MCS component 830 as described with reference to FIG. 8.

At 1215, the method may include communicating with the second device based on transmitting the first indication of the MCS and the second indication that the MCS is associated with the full-duplex communications at the first device. Communicating may include identifying time-frequency resources over which communications is to occur and communicating over the time-frequency resources. The operations of 1215 may be performed in accordance with examples as disclosed herein. In some examples, aspects of the operations of 1215 may be performed by a communication component 840 as described with reference to FIG. 8.

Figure 13:
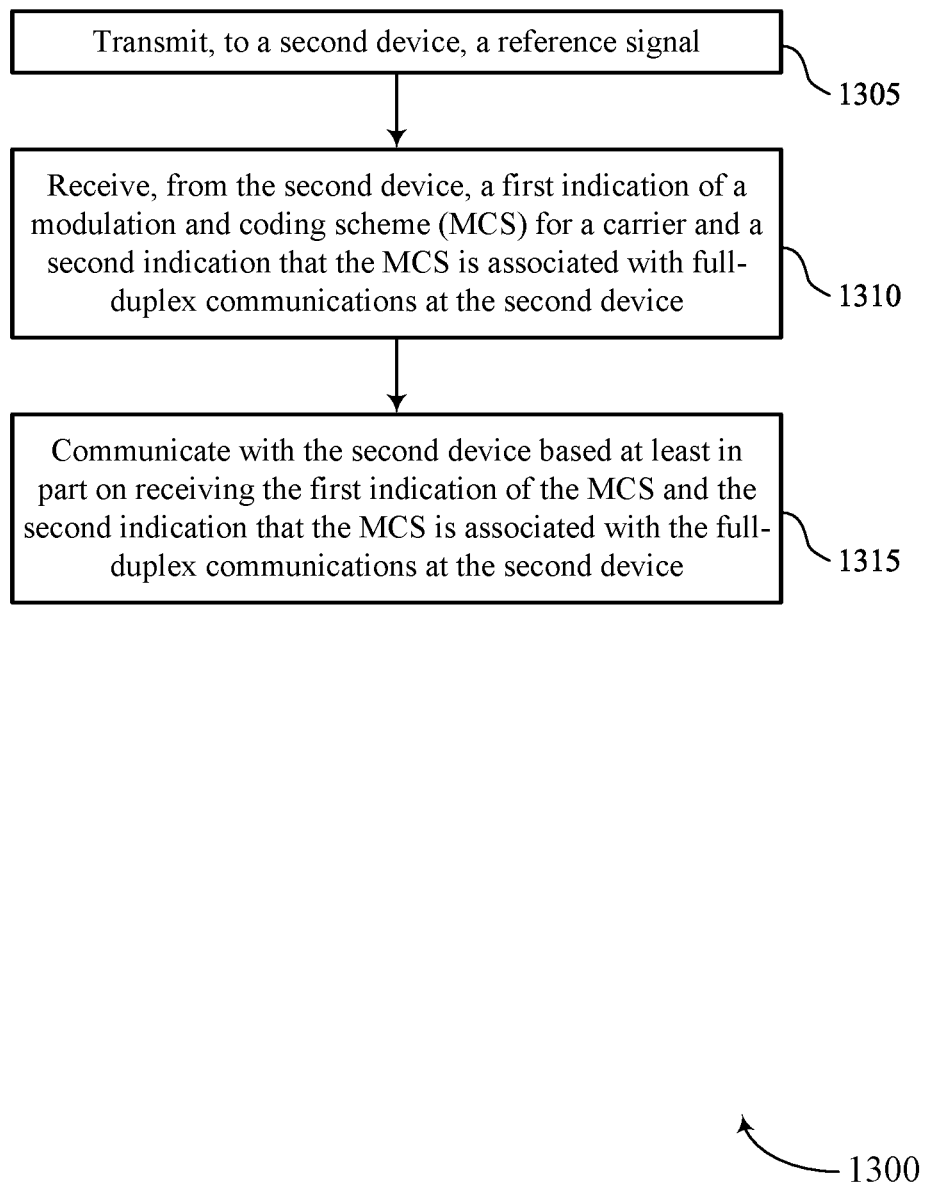

FIG. 13 shows a flowchart illustrating a method 1300 that supports measuring self-interference for full-duplex communications in accordance with aspects of the present disclosure. The operations of the method 1300 may be implemented by a UE, a base station, a wireless device, or its components as described herein. For example, the operations of the method 1300 may be performed by a UE 115, a base station 105, a first wireless device 205, or a second wireless device 210 as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1305, the method may include transmitting, to a second device, a reference signal. Transmitting the reference signal may include identifying time-frequency resources over which the reference signal is to be transmitted and transmitting the reference signal over the time-frequency resources. The operations of 1305 may be performed in accordance with examples as disclosed herein. In some examples, aspects of the operations of 1305 may be performed by a reference signal component 825 as described with reference to FIG. 8.

At 1310, the method may include receiving, from the second device, a first indication of a modulation and coding scheme (MCS) for a carrier and a second indication that the MCS is associated with full-duplex communications at the second device. Receiving the first and second indications may include identifying time-frequency resources over which the first and second indications are to be received and receiving the first and second indications over the time-frequency resources. The operations of 1310 may be performed in accordance with examples as disclosed herein. In some examples, aspects of the operations of 1310 may be performed by an MCS component 830 as described with reference to FIG. 8.

At 1315, the method may include communicating with the second device based on receiving the first indication of the MCS and the second indication that the MCS is associated with the full-duplex communications at the second device. Communicating may include identifying time-frequency resources over communications are to occur and communicating over the time-frequency resources. The operations of 1315 may be performed in accordance with examples as disclosed herein. In some examples, aspects of the operations of 1315 may be performed by a communication component 840 as described with reference to FIG. 8.

Figure 14:
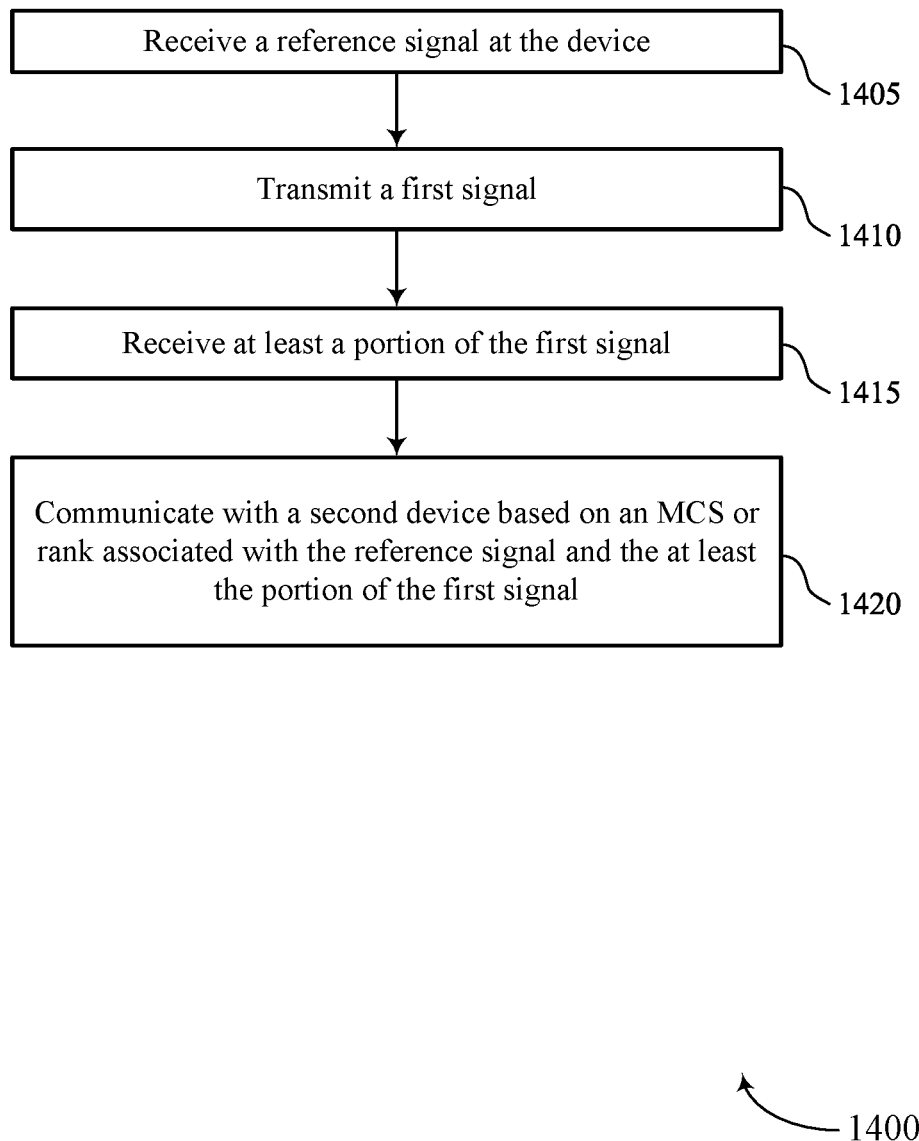

FIG. 14 shows a flowchart illustrating a method 1400 that supports measuring self-interference for full-duplex communications in accordance with aspects of the present disclosure. The operations of the method 1400 may be implemented by a UE, a base station, a wireless device, or its components as described herein. For example, the operations of the method 1400 may be performed by a UE 115, a base station 105, a first wireless device 205, or a second wireless device 210 as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1405, the method may include receiving a reference signal at the device. Receiving the reference signal may include identifying time-frequency resources over which the reference signal is to be received and receiving the reference signal over the time-frequency resources. The operations of 1405 may be performed in accordance with examples as disclosed herein. In some examples, aspects of the operations of 1405 may be performed by a reference signal component 825 as described with reference to FIG. 8.

At 1410, the method may include transmitting a first signal. Transmitting the first signal may include identifying time-frequency resources over which the first signal is to be transmitted and transmitting over the identified time-frequency resources. The operations of 1405 may be performed in accordance with examples as disclosed herein. In some examples, aspects of the operations of 1410 may be performed by a self-interference component 845 as described with reference to FIG. 8.

At 1415, the method may include receiving at least a portion of the first signal. Receiving the at least the portion of the first signal may include identifying time-frequency resources over which the at least the portion of the first signal is to be received and receiving the at least the portion of the first signal over the identified time-frequency resources. The operations of 1415 may be performed in accordance with examples as disclosed herein. In some examples, aspects of the operations of 1415 may be performed by a self-interference component 845 as described with reference to FIG. 8.

At 1420, the method may include communicating with a second device based on a MCS or rank associated with the reference signal and the at least the portion of the first signal. Communicating may include identifying time-frequency resources over which communications are to occur and communicating over the identified time-frequency resources. The operations of 1415 may be performed in accordance with examples as disclosed herein. In some examples, aspects of the operations of 1415 may be performed by a communication component 840 as described with reference to FIG. 8.

The following provides an overview of aspects of the present disclosure:

Aspect 1: A method for wireless communication at a first device, comprising: transmitting a reference signal to a second device over a first carrier, wherein the first carrier is configured for full-duplex operations for the first device; receiving, from the second device, an indication of channel state information for the first carrier based at least in part on transmitting the reference signal; receiving, from the second device, an interference report for the first carrier, wherein the interference report is associated with a measurement resource of the first carrier coinciding with a transmission resource for the second device over the first carrier or a second carrier; communicating with the second device based at least in part on a modulation and coding scheme (MCS), the MCS determined based at least in part on the channel state information and the interference report.

Aspect 2: The method of aspect 1, further comprising: communicating with the second device based at least in part on a rank, the rank determined based at least in part on the channel state information and the interference report.

Aspect 3: The method of aspect 2, wherein the channel state information comprises an indication of a second rank, the rank is determined based at least in part on the second rank.

Aspect 4: The method of aspect 3, further comprising: communicating with the second device over second resources based at least in part on the second rank, wherein communicating based at least in part on the second rank is based at least in part on the second device being configured to perform half-duplex communications for the second resources.

Aspect 5: The method of any of aspects 1 through 4, wherein communicating based at least in part on the MCS is based at least in part on the second device being configured to perform full-duplex communications for a resource associated with the communicating.

Aspect 6: The method of any of aspects 1 through 5, wherein the channel state information comprises a second MCS, the MCS determined based at least in part on the second MCS.

Aspect 7: The method of any of aspects 1 through 6, further comprising:
communicating with the second device over second resources based at least in part on the second MCS, wherein communicating based at least in part on the second MCS is based at least in part on the second device being configured to perform half-duplex communications for the second resources.

Aspect 8: The method of any of aspects 1 through 7, wherein receiving the interference report comprises: receiving a cross-link interference report associated with the measurement resource of the first carrier coinciding with the transmission resource for the second device.

Aspect 9: The method of any of aspects 1 through 8, wherein the reference signal is scheduled to be transmitted over a resource that overlaps with the transmission resource in time and frequency, and the measurement resource coincides with the transmission resource over the first carrier.

Aspect 10: The method of any of aspects 1 through 9, wherein the reference signal is scheduled to be transmitted over a resource of the first carrier that overlaps with the transmission resource in time, and the transmission resource is over the second carrier.

Aspect 11: The method of any of aspects 1 through 10, wherein the first device comprises a base station and the second device comprises a UE.

Aspect 12: The method of any of aspects 1 through 11, wherein the indication of the channel state information and the interference report are multiplexed in a same message.

Aspect 13: A method for wireless communication at a first device, comprising: receiving, from a second device, a reference signal over first resources of a first carrier, wherein the first carrier is configured for full-duplex operations for the first device; transmitting a first signal over second resources that overlap in time with the first resources for receiving the reference signal; receiving at least a portion of the first signal; determining a modulation and coding scheme (MCS) based at least in part on receiving the reference signal and the at least the portion of the first signal; and communicating with the second device based at least in part on the determined MCS.

Aspect 14: The method of aspect 13, further comprising: determining a rank based at least in part on receiving the reference signal and the at least the portion of the first signal, wherein communicating with the second device is based at least in part on the determined rank.

Aspect 15: The method of any of aspects 13 through 14, further comprising: measuring self-interference at the first device based at least in part on receiving the at least the portion of the first signal, wherein determining the MCS is based at least in part on measuring the self-interference.

Aspect 16: The method of any of aspects 13 through 15, wherein the second resources are of the first carrier.

Aspect 17: The method of any of aspects 13 through 16, wherein the second resources are of a second carrier different than the first carrier.

Aspect 18: The method of any of aspects 13 through 17, wherein the first device comprises a base station and the second device comprises a UE.

Aspect 19: A method for wireless communication at a first device, comprising: receiving, from a second device, a reference signal; transmitting, to the second device, a first indication of a modulation and coding scheme (MCS) for a carrier and a second indication that the MCS is associated with full-duplex communications at the first device; communicating with the second device based at least in part on transmitting the first indication of the MCS and the second indication that the MCS is associated with the full-duplex communications at the first device.

Aspect 20: The method of aspect 19, further comprising: transmitting, to the second device, a third indication of a rank and a fourth indication that the rank is associated with full-duplex communications on the carrier at the first device, wherein communicating with the second device is based at least in part on transmitting the third indication of the rank and the fourth indication that the rank is associated with full-duplex communications at the first device.

Aspect 21: The method of aspect 20, wherein the second indication and the fourth indication correspond to a same bit.

Aspect 22: The method of any of aspects 19 through 21, further comprising: performing full-duplex communications at the first device, wherein performing the full-duplex communications comprises transmitting a signal on the carrier and receiving at least a portion of the signal at the first device, and wherein transmitting the first indication and the second indication is based at least in part on receiving the at least the portion of the signal.

Aspect 23: The method of aspect 22, wherein the at least the portion of the signal is received on the carrier.

Aspect 24: The method of any of aspects 22 through 23, wherein the at least the portion of the signal is received on a second carrier different than the carrier.

Aspect 25: The method of any of aspects 19 through 24, wherein transmitting the first indication and the second indication comprises: transmitting, to the second device, channel state feedback that comprises the first indication and the second indication.

Aspect 26: The method of any of aspects 19 through 25, wherein receiving the reference signal comprises: receiving, from the second device, a channel state information reference signal.

Aspect 27: The method of any of aspects 19 through 26, wherein the first device comprises a UE and the second device comprises a base station.

Aspect 28: A method for wireless communication at a first device, comprising: transmitting, to a second device, a reference signal; receiving, from the second device, a first indication of a modulation and coding scheme (MCS) for a carrier and a second indication that the MCS is associated with full-duplex communications at the second device; and communicating with the second device based at least in part on receiving the first indication of the MCS and the second indication that the MCS is associated with the full-duplex communications at the second device.

Aspect 29: The method of aspect 28, further comprising: receiving, from the second device, a third indication of a rank and a fourth indication that the rank is associated with full-duplex communications on the carrier at the first device, wherein communicating with the second device is based at least in part on receiving the third indication of the rank and the fourth indication that the rank is associated with full-duplex communications at the second device.

Aspect 30: The method of aspect 29, wherein the second indication and the fourth indication correspond to a same bit.

Aspect 31: The method of any of aspects 28 through 30, wherein receiving the first indication and the second indication comprises: receiving, from the second device, channel state feedback that comprises the first indication and the second indication.

Aspect 32: The method of any of aspects 28 through 31, wherein the first device comprises a base station and the second device comprises a UE.

Aspect 33: An apparatus for wireless communication at a first device, comprising a processor; memory coupled with the processor; and instructions stored in the memory and executable by the processor to cause the apparatus to perform a method of any of aspects 1 through 12.

Aspect 34: An apparatus for wireless communication at a first device, comprising at least one means for performing a method of any of aspects 1 through 12.

Aspect 35: A non-transitory computer-readable medium storing code for wireless communication at a first device, the code comprising instructions executable by a processor to perform a method of any of aspects 1 through 12.

Aspect 36: An apparatus for wireless communication at a first device, comprising a processor; memory coupled with the processor; and instructions stored in the memory and executable by the processor to cause the apparatus to perform a method of any of aspects 13 through 18.

Aspect 37: An apparatus for wireless communication at a first device, comprising at least one means for performing a method of any of aspects 13 through 18.

Aspect 38: A non-transitory computer-readable medium storing code for wireless communication at a first device, the code comprising instructions executable by a processor to perform a method of any of aspects 13 through 18.

Aspect 39: An apparatus for wireless communication at a first device, comprising a processor; memory coupled with the processor; and instructions stored in the memory and executable by the processor to cause the apparatus to perform a method of any of aspects 19 through 27.

Aspect 40: An apparatus for wireless communication at a first device, comprising at least one means for performing a method of any of aspects 19 through 27.

Aspect 41: A non-transitory computer-readable medium storing code for wireless communication at a first device, the code comprising instructions executable by a processor to perform a method of any of aspects 19 through 27.

Aspect 42: An apparatus for wireless communication at a first device, comprising a processor; memory coupled with the processor; and instructions stored in the memory and executable by the processor to cause the apparatus to perform a method of any of aspects 28 through 32.

Aspect 43: An apparatus for wireless communication at a first device, comprising at least one means for performing a method of any of aspects 28 through 32.

Aspect 44: A non-transitory computer-readable medium storing code for wireless communication at a first device, the code comprising instructions executable by a processor to perform a method of any of aspects 28 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   one or more processors;
   one or more memories coupled with the one or more processors; and
   instructions stored in the one or more memories and executable by the one or more processors to cause the apparatus to:

transmit a reference signal to a second device over a first carrier, wherein the first carrier is configured for full-duplex operations for the first device;

receive, from the second device, an indication of channel state information for the first carrier based at least in part on transmitting the reference signal;

receive, from the second device, an interference report for the first carrier, wherein the interference report is associated with a measurement resource of the first carrier coinciding with a transmission resource for the second device over the first carrier, and wherein the interference report includes a measured value of self-interference at the second device, and wherein the reference signal is scheduled to be transmitted over a resource that overlaps with the transmission resource in time and frequency, and wherein the measurement resource coincides with the transmission resource over the first carrier; and communicate with the second device based at least in part on a modulation and coding scheme (MCS) for the first carrier, the MCS determined based at least in part on the channel state information and the interference report.

2. The apparatus of claim 1, wherein the instructions are further executable by the one or more processors to cause the apparatus to:

communicate with the second device based at least in part on a rank, the rank determined based at least in part on the channel state information and the interference report.

3. The apparatus of claim 2, wherein the channel state information comprises an indication of a second rank, wherein the rank is determined based at least in part on the second rank.

4. The apparatus of claim 3, wherein the instructions are further executable by the one or more processors to cause the apparatus to:

communicate with the second device over second resources based at least in part on the second rank, wherein communicating based at least in part on the second rank is based at least in part on the second device being configured to perform half-duplex communications for the second resources.

5. The apparatus of claim 1, wherein communicating based at least in part on the MCS is based at least in part on the second device being configured to perform full-duplex communications for a resource associated with the communicating.

6. The apparatus of claim 1, wherein the channel state information comprises a second MCS, the MCS determined based at least in part on the second MCS.

7. The apparatus of claim 6, wherein the instructions are further executable by the one or more processors to cause the apparatus to:

communicate with the second device over second resources based at least in part on the second MCS, wherein communicating based at least in part on the second MCS is based at least in part on the second device being configured to perform half-duplex communications for the second resources.

8. The apparatus of claim 1, wherein the instructions to receive the interference report are executable by the one or more processors to cause the apparatus to:

receive a cross-link interference report associated with the measurement resource of the first carrier coinciding with the transmission resource for the second device.

9. The apparatus of claim 1, wherein the first device comprises a base station and the second device comprises a user equipment (UE).

10. The apparatus of claim 1, wherein the indication of the channel state information and the interference report are multiplexed in a same message.

11. An apparatus for wireless communication at a first device, comprising:

one or more processors;

one or more memories coupled with the one or more processors; and instructions stored in the one or more memories and executable by the one or more processors to cause the apparatus to:

receive, from a second device, a reference signal;

transmit, to the second device, a first indication of a modulation and coding scheme (MCS) for a carrier and a second indication that the MCS is associated with full-duplex communications at the first device; and communicate with the second device based at least in part on transmitting the first indication of the MCS for the carrier and the second indication that the MCS is associated with the full-duplex communications at the first device.

12. The apparatus of claim 11, wherein the instructions are further executable by the one or more processors to cause the apparatus to:

transmit, to the second device, a third indication of a rank and a fourth indication that the rank is associated with full-duplex communications on the carrier at the first device, wherein communicating with the second device is based at least in part on transmitting the third indication of the rank and the fourth indication that the rank is associated with full-duplex communications at the first device.

13. The apparatus of claim 11, wherein the instructions are further executable by the one or more processors to cause the apparatus to:

perform full-duplex communications at the first device, wherein performing the full-duplex communications comprises transmitting a signal on the carrier and receiving at least a portion of the signal at the first device, and wherein transmitting the first indication and the second indication is based at least in part on receiving the at least the portion of the signal.

14. The apparatus of claim 13, wherein the at least the portion of the signal is received on the carrier.

15. The apparatus of claim 13, wherein the at least the portion of the signal is received on a second carrier different than the carrier.

16. The apparatus of claim 11, wherein the instructions to transmit the first indication and the second indication are executable by the one or more processors to cause the apparatus to:

transmit, to the second device, channel state feedback that comprises the first indication and the second indication.

17. The apparatus of claim 11, wherein the instructions to receive the reference signal are executable by the one or more processors to cause the apparatus to:

receive, from the second device, a channel state information reference signal.

18. The apparatus of claim 11, wherein the first device comprises a user equipment (UE) and the second device comprises a base station.

19. An apparatus for wireless communication at a first device, comprising:

one or more processors;
one or more memories coupled with the one or more processors; and
instructions stored in the one or more memories and executable by the one or more processors to cause the apparatus to:
transmit, to a second device, a reference signal;
receive, from the second device, a first indication of a modulation and coding scheme (MCS) for a carrier and a second indication that the MCS is associated with full-duplex communications at the second device; and
communicate with the second device based at least in part on receiving the first indication of the MCS for the carrier and the second indication that the MCS is associated with the full-duplex communications at the second device.

20. The apparatus of claim 19, wherein the instructions are further executable by the one or more processors to cause the apparatus to:

receive, from the second device, a third indication of a rank and a fourth indication that the rank is associated with full-duplex communications on the carrier at the first device, wherein communicating with the second device is based at least in part on receiving the third indication of the rank and the fourth indication that the rank is associated with full-duplex communications at the second device.

21. The apparatus of claim 19, wherein the instructions to receive the first indication and the second indication are executable by the one or more processors to cause the apparatus to:

receive, from the second device, channel state feedback that comprises the first indication and the second indication.

22. The apparatus of claim 19, wherein the first device comprises a base station and the second device comprises a user equipment (UE).

* * * * *